US008780527B2

(12) United States Patent
Thompson et al.

(10) Patent No.: US 8,780,527 B2
(45) Date of Patent: Jul. 15, 2014

(54) TRANSITION METAL CARBIDE OR NITRIDE OR BORIDE BASED SUPERCAPACITORS WITH METAL FOAM ELECTRODE SUBSTRATE

(75) Inventors: Levi T. Thompson, Northville, MI (US); Paul Rasmussen, Ann Arbor, MI (US); Gunnar Walther, Dresden (DE); Burghardt Kloeden, Dresden (DE)

(73) Assignees: The Regents of the University of Michigan, Ann Arbor, MI (US); Fraunhofer-Gesellschaft zur Förderung der Angewandten Forschung E.V., München (DE)

(*) Notice: Subject to any disclaimer, the term of this patent is extended or adjusted under 35 U.S.C. 154(b) by 129 days.

(21) Appl. No.: 13/272,016

(22) Filed: Oct. 12, 2011

(65) Prior Publication Data
US 2012/0087061 A1 Apr. 12, 2012

Related U.S. Application Data

(60) Provisional application No. 61/392,320, filed on Oct. 12, 2010.

(51) Int. Cl.
*H01G 9/15* (2006.01)
*H01G 9/042* (2006.01)

(52) U.S. Cl.
CPC . *H01G 9/15* (2013.01); *H01G 9/042* (2013.01)
USPC .......................... 361/502; 29/25.03

(58) Field of Classification Search
CPC ......... H01G 9/15; H01G 9/042; H01G 11/02; H01G 9/012; H01G 9/0029; H01G 9/155; H01G 9/102; H01G 9/058; H01G 9/038; H01G 9/16
USPC .......................... 361/502; 29/25.03
See application file for complete search history.

(56) References Cited

U.S. PATENT DOCUMENTS

| 5,680,292 A | 10/1997 | Thompson, Jr. et al. |
| 5,837,630 A | 11/1998 | Owens et al. |

(Continued)

FOREIGN PATENT DOCUMENTS

| DE | 10150948 C1 | 5/2003 |
| DE | 10316929 B3 | 9/2004 |

(Continued)

OTHER PUBLICATIONS

International Preliminary Report on Patentability for corresponding international application No. PCT/US2011/055997, dated Apr. 16, 2013.

(Continued)

*Primary Examiner* — Timothy Thompson
*Assistant Examiner* — Charles Pizzuto
(74) *Attorney, Agent, or Firm* — Marshall, Gerstein & Borun LLP

(57) ABSTRACT

In accordance with an embodiment of the disclosure, a method of making a supercapacitor includes impregnating a foam electrode substrate with an active material precursor, wherein the foam electrode substrate includes a plurality of pores and the active material precursor is dispersed into the pores. The method further includes reacting the active material precursor infiltrated foam substrate with a reductant under conditions sufficient to convert the active material precursor to an active material, wherein the active material is based on a nitride, an oxynitride, a carbide, or an oxycarbide of a metal selected from Groups III, IV, V, VI, or VII of the Periodic Table.

31 Claims, 23 Drawing Sheets

(56) References Cited

U.S. PATENT DOCUMENTS

| | | | |
|---|---|---|---|
| 6,380,627 B1 | 4/2002 | Weihs et al. | |
| 6,649,305 B1 | 11/2003 | Bugnet et al. | |
| 6,908,711 B2* | 6/2005 | Fauteux et al. | 429/231.95 |
| 6,926,969 B2 | 8/2005 | Bohm et al. | |
| 7,384,686 B2 | 6/2008 | Penneau et al. | |
| 7,835,136 B2 | 11/2010 | Feaver et al. | |
| 8,012,598 B2 | 9/2011 | Naumann et al. | |
| 2005/0265882 A1 | 12/2005 | Naumann et al. | |
| 2005/0272214 A1* | 12/2005 | Chiang et al. | 438/309 |
| 2006/0280637 A1 | 12/2006 | Naumann et al. | |
| 2007/0243718 A1* | 10/2007 | Shiratori et al. | 438/758 |
| 2008/0031767 A1 | 2/2008 | Naumann et al. | |
| 2008/0148940 A1 | 6/2008 | Bohm et al. | |
| 2008/0158778 A1 | 7/2008 | Lipka et al. | |
| 2009/0061312 A1 | 3/2009 | Zhamu et al. | |
| 2009/0290287 A1* | 11/2009 | Lipka et al. | 361/502 |
| 2009/0303660 A1 | 12/2009 | Nair et al. | |
| 2011/0242730 A1* | 10/2011 | Zhou et al. | 361/502 |
| 2012/0200308 A1* | 8/2012 | Donne | 324/686 |
| 2012/0249089 A1* | 10/2012 | Risser et al. | 320/167 |

FOREIGN PATENT DOCUMENTS

| | | |
|---|---|---|
| DE | 102004014076 B3 | 12/2005 |
| DE | 102004032089 B3 | 12/2005 |
| DE | 102005010248 A1 | 8/2006 |
| WO | WO-96/19003 A1 | 6/1996 |
| WO | WO-97/16245 A1 | 5/1997 |
| WO | WO-2005037467 A2 | 4/2005 |
| WO | WO-2008/112650 | 9/2008 |

OTHER PUBLICATIONS

Anitha et al., Deposition of molybdenum nitride thin films, by r.f. reactive magnetron sputtering, Surface Coatings Technol., 79:50-4 (1996).

*Batteries and Ultra-capacitors for the Smart Power Grid*, 2009. NanoMarkets.

Becker et al., Diffusion barrier properties of tungsten nitride films grown by atomic layer deposition from bis(tert-butylimido)bis(dimethylamido) tungsten and ammonia, Appl. Phys. Lett., 82(14):2239-41 (2003).

Burke, Ultracapacitor technologies and application in hybrid and eectric vehicles, Int. J. Energy Research (2009).

Burke, R&D considerations for the performance and application of electrochemical capacitors, Electrochimica Acta, 53(3):1083-91 (2007).

Chen et al., g-Mo2N/Co3Mo3N composite material for electrochemical supercapacitor electrode, Mater. Chem. Phys., 95(1): 84-8 (2006).

Choi et al., Chemically synthesized nanostructured VN for pseudocapacitor application, Electrochem. Solid-State Lett., 8(8): A418-22 (2005).

Choi et al., Fast and Reversible Surface Redox Reaction in Nanocrystalline Vanadium Nitride Supercapacitors, Adv. Materials, 18(9):1178-82 (2006).

Choi et al., Synthesis, structure, and electrochemical characterization of nanocrystalline tantalum and tungsten nitrides, J. Am. Ceram. Soc., 90(10):3113-20 (2007).

Conway, *Electrochemical Supercapacitors*, New York: Plenum (1999).

Deng et al., Characterization of molybdenum nitride as an ultracapacitor material, Proceedings Electrochem. Soc., 96-25 (Electrochemical Capacitors II): 75-84 (1997).

Glushenkov et al., Structure and capacitive properties of porous nanocrystalline VN prepared by temperature-programmed ammonia reduction of V2O5, Chem. Mater., 22(3):914-21 (2010).

Heyden, Nitrierung von aluminium mit gepulsten ionenstrahlen, Dissertation, Heidelberg (2001).

Hu et al., How to achieve maximum utilization of hydrous ruthenium oxide for supercapacitors, J. Electrochem. Soc., 151(2): A281-A290 (2004).

Hu et al., Cyclic voltammetric deposition of hydrous ruthenium oxide for electrochemical capacitors, J. Electrochem. Soc., 146(7):2465-71 (1999).

Hu et al., Design and tailoring of the nanotubular arrayed architecture of hydrous $RuO_2$ for next generation supercapacitors, Nano Lett., 6(12):2690-5 (2006).

Hu et al., Ideal capacitive behavior of hydrous manganese oxide prepared by anodic deposition, Electrochem. Commun., 4(2):105-9 (2002).

Jiang et al., Electrochemical supercapacitor material based on manganese oxide: preparation and characterization, Electrochimica Acta, 47(15): 2381-6 (2002).

Juodkazis et al., On the charge storage mechanism at RuO2/0.5 M H2SO4 interface. J. Solid State Electrochem., 12(11):1399-1404 (2008).

Kinoshita, *Electrochemical Oxygen Technology*, John Wiley & Sons (1992).

Kohmenko et al., Optimisation of an asymmetric manganese oxide/activated carbon capcitor working at 2 V in aqueous medium, J. Power Sources, 153:183-90 (2006).

Kunz et al., Optimierte SiC-barrierenschicht auf keramischen substraten fur kristalline dunnschichtsolarmodule, Ergebnisse aus Forschung und Entwicklung, Zae Bayern, S.38-29 (2002).

Kwon et al., Vanadium nitride catalysts: Synthesis and evaluation for n-butane dehydrogenation, J. Catalysis, 184:236 (1999).

Lee et al., Molybdenum carbide catalysts, J. Catal., 106:125-33 (1987).

Lee et al., Characteristics of plasma enhanced chemical vapor deposited tungsten nitride thin films, Appl. Phys. Lett., 62(25):3312-4 (1993).

Lee et al., Expansion of active site area and improvement of kinetic reversibility in electrochemical pseudocapacitor electrode, Electrochem. Solid-State Lett., 4(3):A19-22 (2001).

Lee et al., Supercapacitor behavior with KCI electrolyte, J. Solid State Chem., 144(1):220-3 (1999).

Li et al., .Synthesis and characterization of uniform nanoparticles of g-Mo2N for supercapacitors, Trans. Nonferrous Metal Soc. China, 19(3):620-5 (2009).

Lipatnikov et al., Effects of vacancy ordering on structure and properties of vanadium carbide, J. Alloys Compounds, 261:192-7 (1997).

Liu et al., Behavior of molybdenum nitrides as materials for electrochemical capacitors, J. Electrochem., Soc., 145(6): 1882-8 (1998).

Ma et al., Solid state NMR investigation of hydrous ruthenium oxide, Chem. Phys. Lett., 331(1): 64-70 (2000).

Martinez et al., Electrical, optical and mechanical properties of sputtered CrNy and Cr1-xSixN1.02 thing films, Thin Solid Films, 447-448:332-6 (2004).

Mastragostino et al., Electronically conducting polymers and activated carbon: Electrode materials in supercapacitor technology, Adv. Materials, 8(4):331-4 (1996).

Miller et al., Electrochemical capacitors: challenges and opportunities for real-world applications, Electrochem. Soc. Interface, 17(1):53-7 (2008).

Naoi et al., Electrochemistry of Poly(1,5-diaminoanthraquinone) and Its Application in Electrochemical Capacitor Materials, J. Electrochem. Soc., 147(2): 420-6 (2000).

Olivetti et al., Electrochemical characterization of vanadium oxide nanostructured electrode, J. Electrochem. Soc., 155(7): A488-A493 (2008).

Papaconstantopoulos, Electronic properties of transition-metal nitrides: the group-V and group-Vi nitrides VN, NbN, TaN, CrN, MoN, and WN, Phys. Rev. B, 31:752-61 (1984).

*Performance Specification; Batteries, Storage: Automotive, Valve Regulated Lead Acid*, MIL-PRF-32143A(AT), 2010.

Pourbaix, *Atlas of Electrochemical Equilibria in Aqueous Solutions*. 1974, NACE International.

Rudge et al., Conducting polymers as active materials in electrochemical capacitors, J. Power Sources, 47(1-2):89-107 (1994).

Salitra et al., Carbon electrodes for double-layer capacitors. 1. Relations between ion and pore dimensions, J. Electrochem. Soc., 147:2486 (2000).

(56) References Cited

OTHER PUBLICATIONS

Sawaguchi et al., Mechanical and electrical properties of silicon nitride-silicon carbide nanocomposite material, J. Am. Ceram. Soc., 74(5):1142-4 (1991).

Sevilla et al., Performance of templated mesoporous carbons in supercapacitors, Electrochim. Acta, 52:3207 (2007).

Simon et al., Materials for electrochemical capacitors, Nat. Mater., 7(11):845-54 (2008).

Taylor et al., Nanoimprinted electrodes for micro-fuel cell applications, J. Power Sources, 171:218 (2007).

Toth, *Transition Metal Carbides and Nitrides*, Academic Press, New York (1971).

Toupin et al., Charge storage mechanism of MnO2 electrode used in aqueous electrochemical capacitor, Chem. Mater., 16(16):3184-90 (2004).

Trasatti et al., Ruthenium dioxide: a new interesting electrode material. Solid state structure and electrochemical behavior. J. Electroanal. Chem. Interfacial Electrochem., 29(2):1-2 (1971).

Wang et al., Review: electrical properties of high-temperature oxides, borides, carbides, and nitrides, J. Material Sci., 30:1627-41 (1995).

Wixom et al., High surface area metal carbide and metal nitride electrodes, Material Research Society Symposium Proceedings, 496:643-53 (1998).

*World Ultracapacitor Markets*, Frost and Sullivan, N661-27 (2009).

Yang et al., Electrodeposited nickel hydroxide on nickel foam with ultrahigh capacitance, Chem. Commun. (2008).

Zheng et al., A new charge storage mechanism for electrochemical capacitors, Electrochem. Soc. Lett., 142(1):L6-L8 (1995).

Zheng et al., Hydrous ruthenium oxide as an electrode material for electrochemical capacitors, J. Electrochem. Soc., 142(8): 2699-703 (1995).

Zheng et al., Ruthenium oxide-carbon composite electrodes for electrochemical capacitors, Electrochem. Solid-State Lett., 2(8):359-61 (1999).

Zhou et al., Study on the electrochemical behavior of vanadium nitride as a promising supercapacitor material, J. Phys. Chem. Solids, 70(2):495-500 (2009).

Zumdahl, *Chemistry*, Boston: Houghton Mifflin (1997).

International Search Report and Written Opinion for corresponding International Application No. PCT/US2011/055997, mailing date Feb. 10, 2012.

\* cited by examiner

TRANSITION METAL CARBIDE OR NITRIDE OR BORIDE BASED SUPERCAPACITORS WITH METAL FOAM ELECTRODE SUBSTRATE

CROSS-REFERENCE TO RELATED APPLICATION

The benefit under 35 U.S.C. §119(e) of U.S. Provisional Patent Application Ser. No. 61/392,320 filed Oct. 12, 2010, is hereby claimed, and its entire disclosure is incorporated herein by reference.

STATEMENT OF GOVERNMENT SUPPORT

This invention was made with government support under grant No. W56HZV-04-2-001 awarded by the Army/TACOM. The government has certain rights in the invention.

BACKGROUND

1. Field of the Disclosure

The disclose relates generally to transition metal carbide and nitride based supercapacitors and methods of making the same, and more particularly, to transition metal carbide and nitride based supercapacitors having a foam electrode structure and methods of making the same.

2. Brief Description of Related Technology

Batteries are important energy storage devices used for military and commercial applications. While these devices can have energy densities exceeding 100 Wh/kg, this energy is difficult to fully access in pulsed and high power applications due to the relatively slow kinetics associated with the redox processes of batteries.

Supercapacitors are a class of electrochemical energy-storage devices that could complement batteries for load-leveling or uninterruptible power supply applications. Referring to FIG. 1, in terms of specific energy and specific power, supercapacitors fill the gap between conventional capacitors and batteries. The times shown in FIG. 1 are the time constants of the device, obtained by dividing the energy density by the power. Currently available supercapacitors are well suited to handle pulses of up to a few seconds. To achieve broader application, however, capacitors will have to efficiently manage longer pulses, which translates to higher energy densities.

Supercapacitors have unusually high capacitances compared to traditional capacitors, due to their charge storage mechanisms. In addition to charge storage during formation of an electrical double layer, a portion of a supercapacitor's capacitance may be from fast, reversible redox reactions taking place near the electrode surface. Supercapacitors provide higher power than batteries, while storing less energy. Most commercial supercapacitors use very high-surface-area carbon-based active materials. These materials typically store charge in the electrical double layer and yield specific capacitances of up to 100 F/g.

Some materials exploit, fast, reversible faradaic redox reactions that occur with the first few nanometers of the surface of the active material. This pseudocapacitive mechanism has been demonstrated for materials including metal oxides and hydroxides, such as $RuO_2$ and $MnO_2$, and conducting polymers such as polyaniline and polypyrrole. Hydrous $RuO_2 \cdot xH_2O$ is a benchmark pseudocapacitive material and has been shown to yield specific capacitances ranging from 720-1300 F/g, depending on the preparation and heat treatment conditions. Despite the high specific capacitance of the Ruthenia-based materials, their high cost makes them unattractive for large-scale use, and therefore the commercial application of Ruthenia-based supercapacitors has been limited.

Despite their proven performance benefits, supercapacitors have not found widespread commercial use, largely due to the need for higher energy densities and lower cost. For example, the United States Department of Energy has targeted energy and power densities of 15 Wh/kg and 700 W/kg, respectively, for supercapacitors to be used for load-leveling and regenerative braking in hybrid and electric vehicles. State-of-the-art symmetric supercapacitors employing high area carbon electrodes and non-aqueous electrolytes can reach energy densities of 3-5 Wh/kg with maximum power densities of 700 W/kg. These devices have been highly optimized, and only incremental gains in energy density are expected in the future.

Transition metal nitrides and carbides have recently been examined for use in supercapacitors. Nitrides and carbides are often highly conductive and can be prepared as high surface area powders. These materials, however, generally have poor mechanical properties and the design of practical supercapacitors using these materials has been hampered by poor adhesion and contact to the current collecting substrates.

SUMMARY OF THE DISCLOSURE

In accordance with an embodiment of the disclosure, an electrode includes a foam substrate comprising a plurality of pores, and an active material infiltrated throughout the foam substrate and disposed within the plurality of pores. The active material comprises any of a metal nitride, a metal oxynitride, a metal carbide, a metal oxycarbide, a metal boride, a metal oxyboride, and combinations thereof, and the metal is selected from the group consisting of Groups III, IV, V, VI, or VII of the Periodic Table.

In accordance with an embodiment of the disclosure, a method of making a supercapacitor includes impregnating a foam electrode substrate with an active material precursor, wherein the foam electrode substrate includes a plurality of pores and the active material precursor is dispersed within the pores. The method further includes reacting the active material precursor infiltrated foam electrode substrate with a reductant under conditions sufficient to convert the active material precursor to an active material, wherein the active material is a metal nitride, a metal oxynitride, a metal carbide, a metal oxycarbide, a metal boride, a metal oxyboride, and combinations thereof, and the metal is selected from Groups III, IV, V, VI, or VII of the Periodic Table.

BRIEF DESCRIPTION OF THE DRAWING FIGURES

Figure 1:
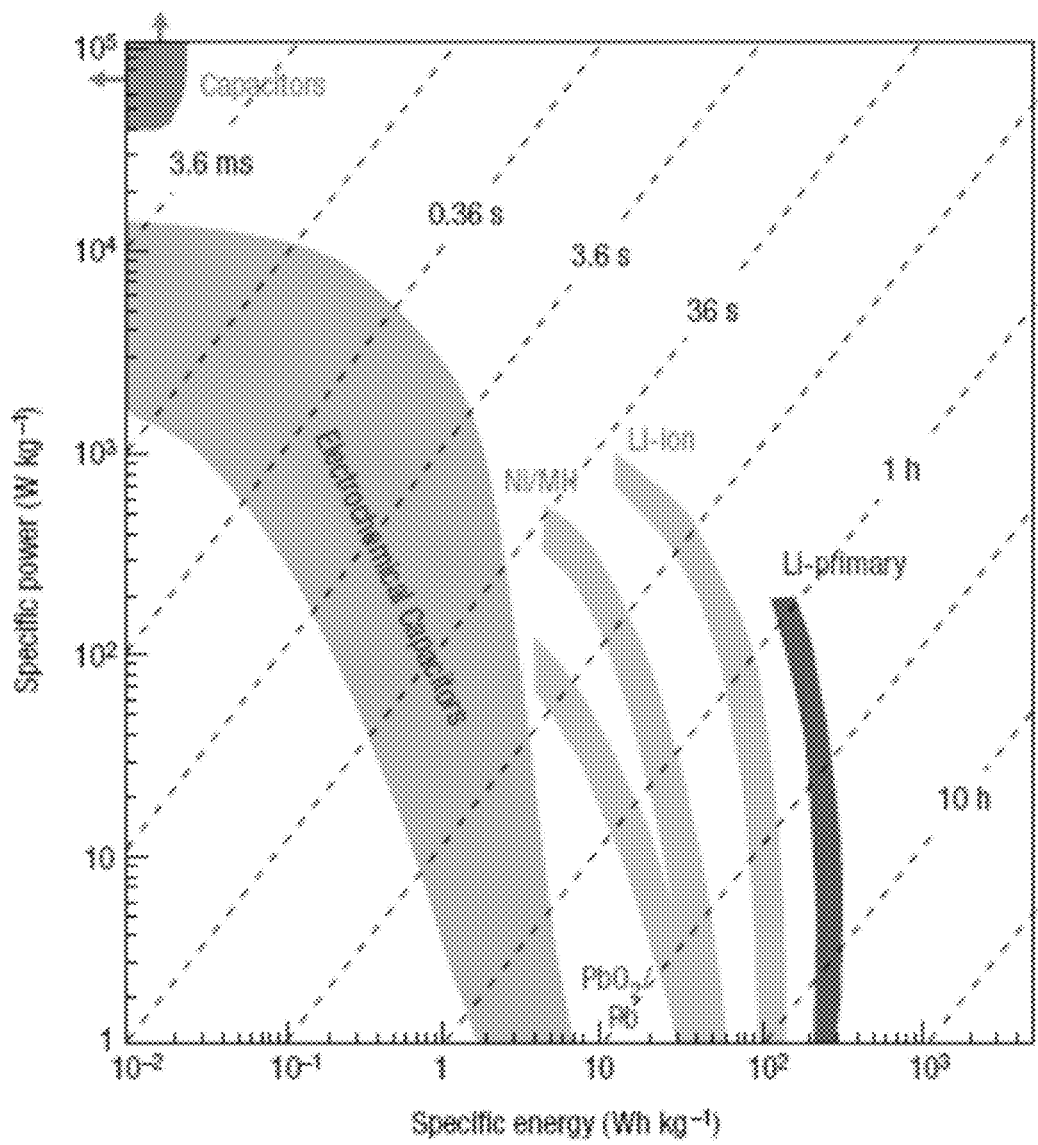
FIG. 1 is a Ragone plot of specific power against specific energy for various conventional energy storage devices.

While the disclosed devices and methods are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION

The present disclosure describes transition metal nitride, oxynitride, carbide, oxycarbide, boride, or oxyboride based electrodes having foam electrode substrates infiltrated with a transition metal nitride, oxynitride, carbide, oxycarbide, boride, or oxyboride based active material and a method of forming the same. Advantageously, the use of the foam electrode substrate provides increased and improved electrical contact and adhesion between the conducting electrode foam substrate and the active material, as compared to electrodes having a foil or other non-porous substrate. The foam electrode substrate includes a plurality of pores; and the active material can be infiltrated throughout the foam and within the pores. The electrodes can be used, for example, in supercapacitors.

Electrodes in accordance with the disclosure have a porous foam substrate and an active material infiltrated throughout the porous foam substrate and disposed within the plurality of pores. As used herein "infiltrated" refers to dispersion of the active material through the entire foam substrate (e.g., from each outer surface to each opposing outer surface), or at least through a functional charge carrying depth of the substrate. In one embodiment, the active material can be homogenously infiltrated throughout the porous foam substrate. In another embodiment, the active material can be non-homogenously infiltrated throughout the foam substrate. For example, the concentration of active material infiltrated throughout the foam substrate can have a concentration gradient across the foam substrate or through a depth of the foam substrate, for example.

Figure 2:
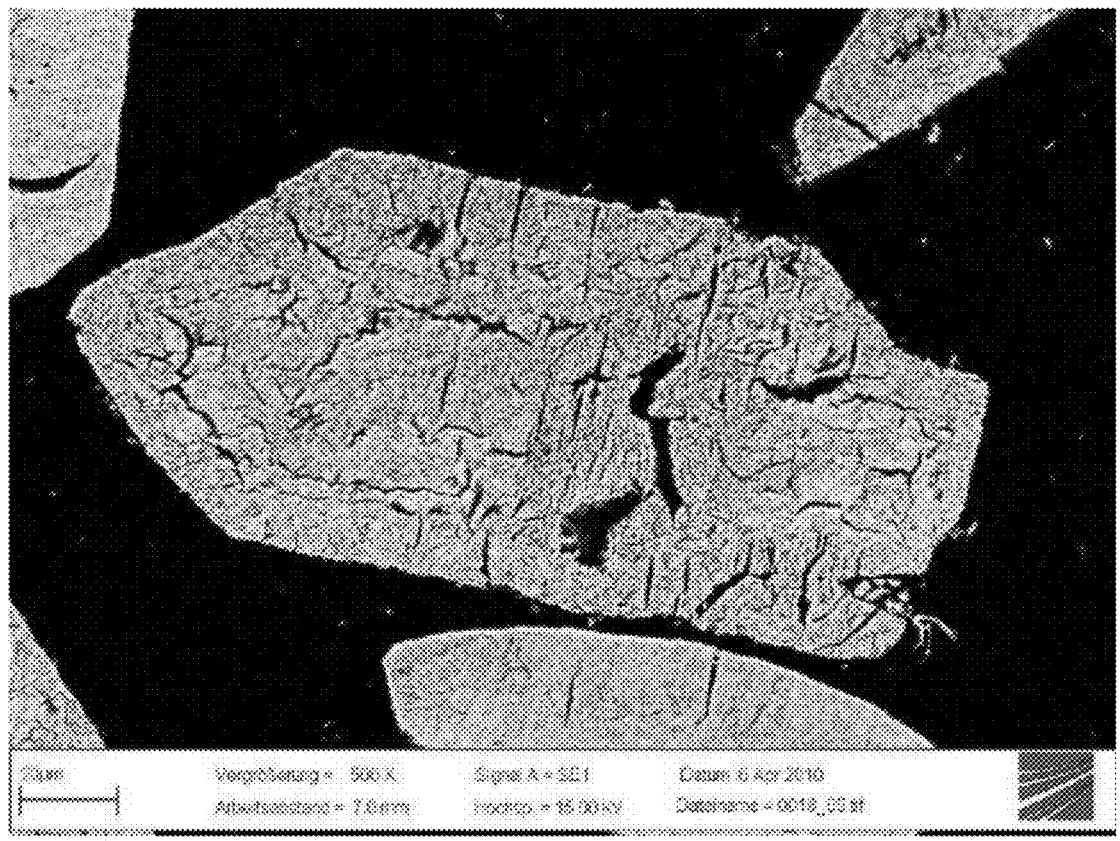
FIG. 2 is a scanning electron micrograph of a high specific surface area VN powder in accordance with an embodiment of the disclosure.

The active material is a nitride, an oxynitride, a carbide, an oxycarbide, a boride, or an oxyboride of a metal of Groups III, IV, V, VI, and VII of the Periodic Table. For example, the active material can be vanadium nitride, vanadium carbide, molybdenum carbide, molybdenum nitride, tungsten carbide, and tungsten nitride. The active material preferably has a high surface area. FIG. 2 is a scanning electron micrograph of a high surface area VN powder.

These materials have electrical conductivities that can be higher than those for transition-metal oxides, and can be produced with specific surface areas exceeding 100 $m^2/g$. High specific surface area active materials can be formed, for example, as described in U.S. Pat. No. 5,680,292, the disclosure of which is incorporated herein in its entirety. The high specific surface area active materials can also be formed in situ, within the foam substrate, in accordance with the methods disclosed herein and discussed in detail below. These materials generally possess good chemical stabilities and are typically inexpensive to produce. Vanadium nitride, for example, has been reported to yield high capacitances of 161 F/g to 1340 F/g depending on the surface area and method of preparation.

The active material can have an average particle size of about 0.5 microns to about 500 microns, about 1 micron to about 100 microns, about 20 microns to about 75 microns, about 10 microns to about 15 microns, about 200 microns to about 500 microns, about 300 microns to about 400 microns, about 250 microns to about 300 microns, about 350 microns to about 500 microns, about 250 microns to about 400 microns, and about 200 microns to about 400 microns. Other suitable average particle sizes include about 0.5, 1, 10, 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, and 500 microns.

aluminum. Nickel alloy foams suitable for use in the electrodes of the disclosure can include, for example, alloying elements such as cobalt, chromium, copper, aluminum, titanium, silicon, tungsten, zirconium, hafnium, and yttrium. The metal foams can be based, for example, on metal foam coils utilizing nickel or iron. Table 1 below provides additional alloy compositions that can be suitable for use as the material of the foam substrates.

TABLE 1

Alloy Foam Compositions (Amounts in weight percents based on total weight of the alloy)

| Alloy Name | Ni | Fe | Cr | Al | Mo | Cu | Co | W | Ti | Si | C | Nb | Zr | Hf | Y |
|---|---|---|---|---|---|---|---|---|---|---|---|---|---|---|---|
| IN 625 | 55.9 | 4.84 | 22.5 | 0.2 | 10.8 | | | | | 1.7 | | 3.8 | | | |
| IN HX | 46.8 | 18 | 23 | | 10 | | 1.5 | 0.6 | | | 0.1 | | | | |
| NIC6025 | 61.4 | 10 | 26 | 2.1 | | | | | 0.15 | | 0.2 | | 0.05 | | 0.09 |
| IN 693 | 59.3 | 5 | 31 | 3.25 | | | | | | | | 1.5 | | | |
| Fe #02 | 50 | 22 | 22 | 6 | | | | | | | | | | | |
| Fe #07 | 47.5 | 21 | 21 | 7.5 | | | | | | 3 | | | | | |
| Fe #11 | 47.9 | 21.1 | 21 | 10 | | | | | | | | | | | |
| NiCu | 50 | | | | | 50 | | | | | | | | | |
| IN 625 w/o Si | 57.8 | 5.04 | 21.7 | | 10.8 | | | | | | | 3.6 | | | |
| Fe #14 | | 72 | 22 | 6 | | | | | | | | | | | |
| Fe #17 | | 72 | 22 | 6 | | | | | | | | | | 0.01 | 0.02 |
| Fe #18 | | 68 | 22 | 10 | | | | | | | | | | | |

As used herein, "foam substrate" refers to any suitable substrate having a porosity extending either through the entire substrate (e.g., from each outer surface to each opposing outer surface), or at least through a functional charge carrying depth of the substrate (e.g., for structures with an internal core region that is not functionalized for contribution to the capacitance).

The foam substrates can perform as the current collector of the electrode. The foam substrate can be a metal or metal alloy foam. Suitable metal foams include, for example, foams of carbon, nickel, copper, titanium, zirconium, tantalum, molybdenum, tungsten, and ruthenium oxide, and combinations and alloys thereof. Other suitable substrate materials include material selected from Groups IV, V, VI, VII, and VIII of the Periodic Table. Metal foams can be formed as is known in the art, for example, as described in U.S. Pat. Nos. 8,012,598 and 6,926,969, and U.S. Patent Publication Nos. 2008/0148940, 2008/0031767, 2006/0280637, and 2005/0265882, the respective disclosures of which are each incorporated herein by reference in their entireties. In one embodiment, the foam substrate is formed of carbon.

The metal foam substrates can be alloyed, for example, to increase their electrochemical stability compared to pure, single metal foams. Alloying can also be used as conventionally known to improve other characteristics of the foam, such as, for example, mechanical properties of the foam. For example, nickel alloys and copper alloys can be used. Suitable metal alloy foams are commercially available from Alantum Europe GmbH (Munich, Germany) and Alantum Corporation (Seoul, Korea). Another suitable commercially available foam is Inconel 625, also referred to herein as "IN 625" (Special Metals Corporation, New York), which is a nickel-based alloy having greater than about 58 wt % nickel, 20 wt % to 23 wt % chromium, less than 5 wt % iron, 8 wt % to 10 wt % molybdenum, and 3.15 wt % to 4.15 wt % niobium. Another suitable nickel-based alloy foam is NiFeCrAl, which includes greater than 44 wt % nickel, 19 wt % to 25 wt % iron, 19 wt % to 25 wt % chromium, and 5 wt % to 7 wt %

Foam IN 625 demonstrated good corrosion stability in acids and basis and good ductility for shaping. The conductivity of Foam Fe#2 and IN 625 of Table 1 were further tested for various pore sizes. The results are shown in Table 2, below.

TABLE 2

Electrical Resistivity of Foam Substrate for Given Pore Size

| | Longitudinal Direction Resistivity ($10^{-3}\, \Omega \cdot cm$) | Transverse Direction Resistivity ($10^{-3}\, \Omega \cdot cm$) |
|---|---|---|
| Fe#2 Foam with 450 micron Pore Size | 4.4 | 5.87 |
| Fe#2 Foam with 580 micron Pore Size | 3.95 | 5.3 |
| Fe#2 Foam with 800 micron Pore Size | 7.25 | 9.87 |
| Fe#2 Foam with 1200 micron Pore Size | 11.46 | 13.3 |
| IN 625 Foam with 450 micron Pore Size | 5.0 | 8.0 |
| IN 625 Foam with 580 micron Pore Size | 7.0 | 9.0 |
| IN 625 Foam with 800 micron Pore Size | 8.0 | 12.0 |
| IN 625 Foam with 1200 micron Pore Size | 12.0 | 15.0 |

Figure 3:
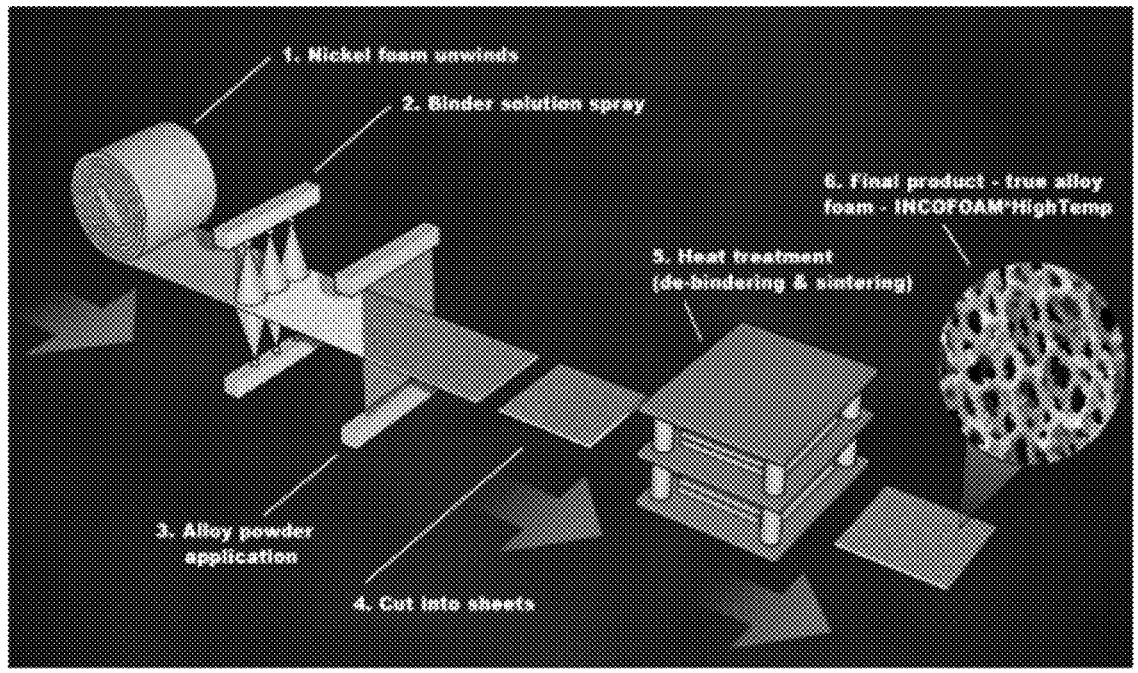
FIG. 3 is a schematic illustration of a method of manufacturing an alloyed nickel-based foam in accordance with an embodiment of the disclosure.
Figure 4:
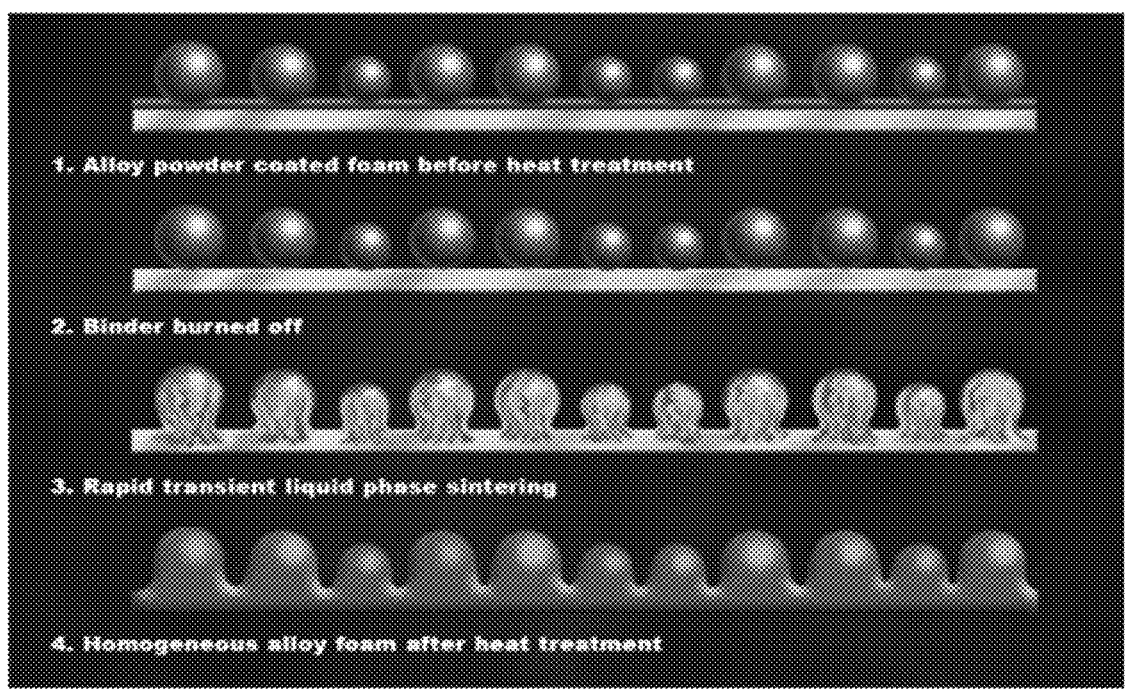
FIG. 4 is a schematic illustration of processes occurring during transient liquid phase sintering with increasing temperature and time during the method illustrated in FIG. 3.
Figure 5A:
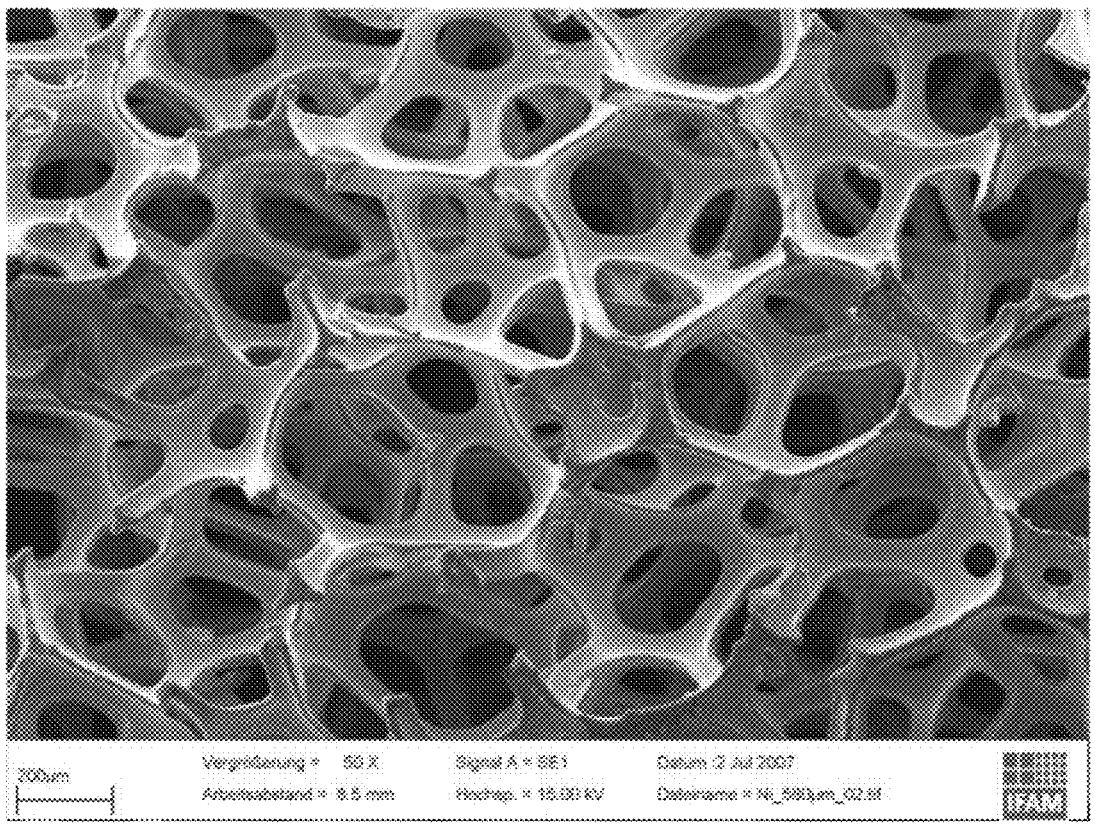
FIG. 5A is a scanning electron micrograph of a pure Ni foam substrate in accordance with an embodiment of the disclosure.
Figure 5B:
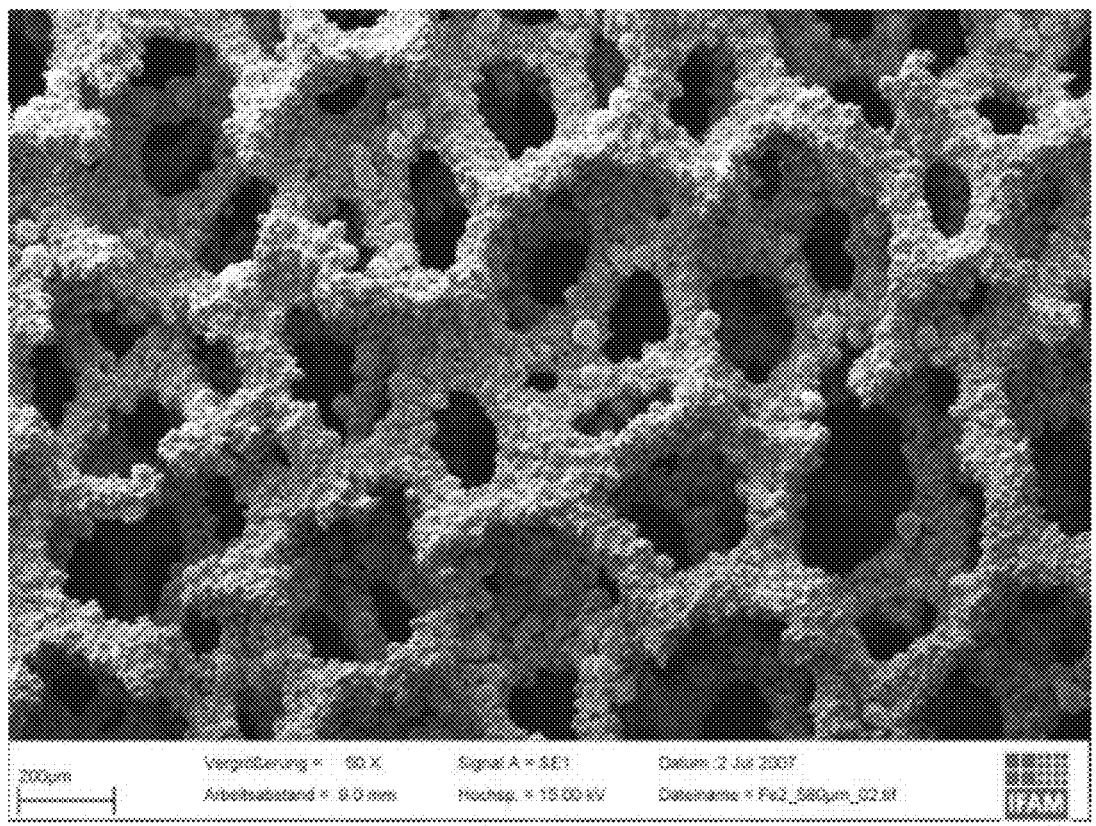
FIG. 5B is a scanning electron micrograph of an alloyed foam substrate in accordance with an embodiment of the disclosure.

FIG. 3 illustrates a schematic of a manufacturing process for transforming commercially available Ni foam into an alloyed foam with high oxidation and corrosion resistance. The main features of this powder metallurgical process are the coating of the Ni foam with a binder using a spraying process and afterwards with a specified high alloyed metal powder. Referring to FIG. 4, the subsequent heat treatment includes debindering and sintering steps. During the transient liquid phase sintering process, elements from the powder diffuse rapidly into the foam struts and ensure a homogeneous alloy foam composition. Micrographs in FIGS. 5A and 5B compare the pure Ni foam and the alloyed foam. The high roughness of the alloyed foam offers a number of advantages, including high specific surface area and good adhesion of coatings.

Prior to infiltration with the active material, the foam substrates can have a porosity, for example, of about 25% to about 98%. As used herein, "porosity" is the volume percent of the pores, crack or open space within the foam. Other suitable porosities prior to infiltration include, about 30% to about 95%, about 35% to about 90%, about 40% to about 85%, about 45% to about 80%, about 50% to about 75%, about 55% to about 70%, about 90% to about 98%, or about 90% to about 95%. For example, the porosity can be about 25, 30, 35, 40, 45, 50, 55, 60, 65, 70, 75, 80, 85, 90, 91, 92, 93, 94, 95, 96, 97, or 98%.

After infiltration with the active material, the electrodes can have a porosity in a range of about 1% to about 25%, about 2% to about 20%, about 4% to about 18%, about 6% to about 14%, about 7% to about 12%, and about 8% to about 10%. Other suitable porosities after infiltration include about 1, 2, 3, 4, 5, 6, 7, 8, 9, 10, 11, 12, 13, 14, 15, 16, 17, 18, 19, 20, 21, 22, 23, 24, and 25%.

Without intending to be bound by theory, it is believed that a decrease in porosity (prior to infiltration) results in an increase in the density of foam struts per unit volume of foam, thereby improving the current collecting ability of the foam substrate and allowing the electrode to achieve a high power. It is further believed that the decrease in porosity (prior to infiltration) results in a decrease in active material volume, which can decrease the energy density of the electrode. Thus, by controlling the porosity (prior to infiltration) of the foam substrate, for example, through calendering, for example, the electrode can be particularly designed to balance power and energy density design considerations. The porosity (prior to infiltration) of the foam substrate can be controlled by any other known methods, as well.

The pores of the foam substrate can be macropores. As used herein "macropore" refers to pores or cavities having a relative diameter greater than 50 nanometers. In one embodiment, the foam substrate can have a pore size in a range of about 50 microns to about 4000 microns, about 100 microns to about 3000 microns, about 200 microns to about 2000 microns, about 300 microns to about 1000 microns, about 400 microns to about 900 microns, about 500 microns to about 800 microns, or about 600 microns to about 700 microns. Other suitable pore sizes include about 50, 60, 70, 80, 90, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 2000, 2100, 2200, 2300, 2400, 2500, 2600, 2700, 2800, 2900, 3000, 3100, 3200, 3300, 3400, 3500, 3600, 3700, 3800, 3900, and 4000 microns.

The energy density and power characteristics of the electrode can also be controlled by controlling the pore size of the foam substrate. Without intending to be bound by theory, it is believed that a reduction in pore size reduces the loading capacity of the foam, thereby reducing the amount of active material that can be infiltrated throughout the foam substrate. This in turn can result in an electrode with a lower energy density. However, smaller pore sized foam substrates are believed to have higher strut densities, which can thereby allow the electrode to have high power. Conversely, it is believed that foam substrates having larger pore sizes allow for increased loading of active material and thereby can allow the electrode to have a high energy density. The larger pore size foam substrates have lower strut densities, which can thereby result in electrodes having lower power.

The foam substrates can have struts having a length of about 50 microns to about 4000 microns. As used herein, "struts" refers to the portions of the foam structure, which define the perimeter of the pores. Other suitable strut lengths include, about 100 microns to about 3000 microns, about 200 microns to about 2000 microns, about 300 microns to about 1000 microns, about 400 microns to about 900 microns, about 500 microns to about 800 microns, about 700 microns to about 1000 microns, about 100 microns to about 500 microns, about 200 microns to about 400 microns, about 300 microns to about 600 microns, and about 800 microns to about 4000 microns. For example, the struts can have a length of about 100, 150, 200, 250, 300, 350, 400, 450, 500, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 2000, 2100, 2200, 2300, 2400, 2500, 2600, 2700, 2800, 2900, 3000, 3100, 3200, 3300, 3400, 3500, 3600, 3700, 3800, 3900, and 4000 microns.

Without intending to be bound by theory, it is believed that the energy density characteristics of the electrode can be tailored by adjusting the strut lengths of the foam substrate. It is believed that short strut lengths reduces the distance a collected charge must travel, thereby allowing the foam substrate to have enhanced performance as a current collector, which in turn can allow the electrode to have high energy densities.

The foam substrate can have a thickness in a range of about 0.2 to about 5 mm, about 0.4 to about 5, about 0.2 mm to about 4 mm, about 0.2 mm to about 2.5 mm, about 0.3 mm to about 2.2 mm, about 0.4 mm to about 2 mm, about 0.5 mm to about 1.8 mm, about 0.6 mm to about 1.7 mm, about 0.7 mm to about 1.6 mm, about 0.8 mm to about 1.4 mm, about 0.9 mm to about 1.2 mm, about 1 mm to about 5 mm, about 2 mm to about 4 mm, and about 1.5 mm to about 3.5 mm. Other suitable thickness can include about 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, and 5 mm. The thickness of the foam can be in the above-described ranges either before or after calendaring.

As described in detail below, the foam substrates can be calendered to reduce the original thickness of the foam. Calendering can be performed to reduce the foam substrate thickness by 50% or more, including, for example, up to 60%, up to 70%, or up to 80%. For example, a foam having an original thickness of about 1.6 mm can be calendered to a thickness of about 0.7 mm, which represents a reduction in thickness of about 56%.

The foam substrates can have a volumetric density of about 0.1 g/cm$^3$ to about 5 g/cm$^3$, about 0.2 g/cm$^3$ to about 4.5 g/cm$^3$, about 0.3 g/cm$^3$ to about 4 g/cm$^3$, about 0.4 g/cm$^3$ to about 3 g/cm$^3$, about 0.5 g/cm$^3$ to about 2 g/cm$^3$, about 0.6 g/cm$^3$ to about 1 g/cm$^3$. Other suitable volumetric densities include about 0.1, 0.2, 0.3, 0.4, 0.5, 0.6, 0.7, 0.8, 0.9, 1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, and 5 g/cm$^3$. Commercially available foams can be purchased having densities for example, of 0.72 g/cm$^3$, 0.6 g/cm$^3$, 0.48 g/cm$^3$, and 0.41 g/cm$^3$.

The foam substrates can have surface area densities of about 300 g/m$^2$ to about 2000 g/m$^2$, about 400 g/m$^2$ to about 1500 g/m$^2$, about 500 g/m$^2$ to about 1000 g/m$^2$, about 1000 g/m$^2$ to about 1500 g/m$^2$, about 1100 g/m$^2$ to about 1450 g/m$^2$, about 1150 g/m$^2$ to about 1400 g/m$^2$, and about 1200 g/m$^2$ to about 1350 g/m$^2$. Other suitable surface area densities include about 300, 325, 350, 375, 400, 425, 450, 475, 500, 525, 550, 575, 1000, 1050, 1100, 1150, 1200, 1250, 1300, 1350, 1400, 1450, 1500, 1550, 1600, 1650, 1700, 1750, 1800, 1850, 1900, 1950, and 2000 g/m². Table 3 below illustrates the properties of some currently commercially available foams.

TABLE 3

Summary of Foam Density and Thickness for Commercially Available Foams Having a Given Pore Size:

| | Alloyed Foam | | |
| --- | --- | --- | --- |
| Pore Size (microns) | Surface Area Density (g/m²) | Volumetric Density (g/cm3) | Thickness (mm) |
| 450 | 1150 | 0.72 | 1.6 |
| 580 | 1150 | 0.60 | 1.9 |
| 800 | 1195 | 0.48 | 2.5 |
| 1200 | 1235 | 0.41 | 3.0 |

Electrodes in accordance with embodiments of the disclosure have high electrical conductivities, and can provide the mechanical and electrochemical stabilities necessary for a number of applications. Supercapacitors formed using the electrodes in accordance with embodiments of the disclosure can have high capacitances.

A supercapacitor in accordance with an embodiment of the disclosure can include a first electrode, a second electrode, and a separator disposed between the first and second electrodes. The electrodes and separators can be disposed in an electrolyte. The supercapacitor can either be a symmetric supercapacitor in which the first and second electrodes can be made of the same material.

Alternatively, the supercapacitor can be an asymmetric supercapacitor. The first electrode has a foam substrate and transition metal nitride, oxynitride, carbide, oxycarbide, boride, or oxyboride as described above. The second electrode can be for example, and oxide. The second electrode can optionally include a foam substrate, which can function as the current collector for the second electrode. In one embodiment, the active material of the first electrode is vanadium nitride and the active material of the second electrode is ruthenium oxide or manganese oxide. Other suitable second electrode active material can include cobalt oxide and nickel oxyhydroxide.

Any suitable separator can be used. For example, a Celgard separator can be used. Commercially available separators can be obtained from Daramic (Charlotte, N.C.).

The electrolyte of either a symmetric or asymmetric supercapacitor can be an aqueous or non-aqueous electrolyte. The aqueous electrolyte can be basic or acidic. Suitable electrolytes include, for example, aqueous sulfuric acid, potassium hydroxide, sodium hydroxide, a solution of lithium perchlorate in propylene carbonate, or a solution of tetrabutyl ammonium fluoride in acetonitrile.

In one embodiment, the supercapacitors have a packaging efficiency of about 30% and have an energy density greater than 2 Wh/g. In other embodiments, the energy density of the supercapacitors can be tailored as described above by adjusting the porosity, strut length, and/or pore size of the foam substrate. For example, the supercapacitors can have energy densities greater than about 2, 3, 4, 5, 6, 7, and 8 (Wh/kg).

Methods of forming the electrodes in accordance with the disclosure can include infiltration of a pre-formed active material into the foam substrate. Any methods of infiltrating a powder throughout the foam substrate can be used.

Alternatively, the active material can be formed in situ within the foam substrate by conversion of an active material precursor material to the nitride, oxynitride, carbide, oxycarbide, boride, or oxyboride active material within the foam substrate. This can advantageously allow for formation of the nitride, oxynitride, carbide, oxycarbide, boride, or oxyboride based electrodes without handling the sensitive high specific surface area nitride, oxynitride, carbide, oxycarbide, boride, or oxyboride active materials, which can prevent decomposition or deterioration of the active material during handling in, for example, a slurry or a paste or as a results or interactions with solvents or surfactants used for the loading the active material into the foam substrate.

Figure 6:
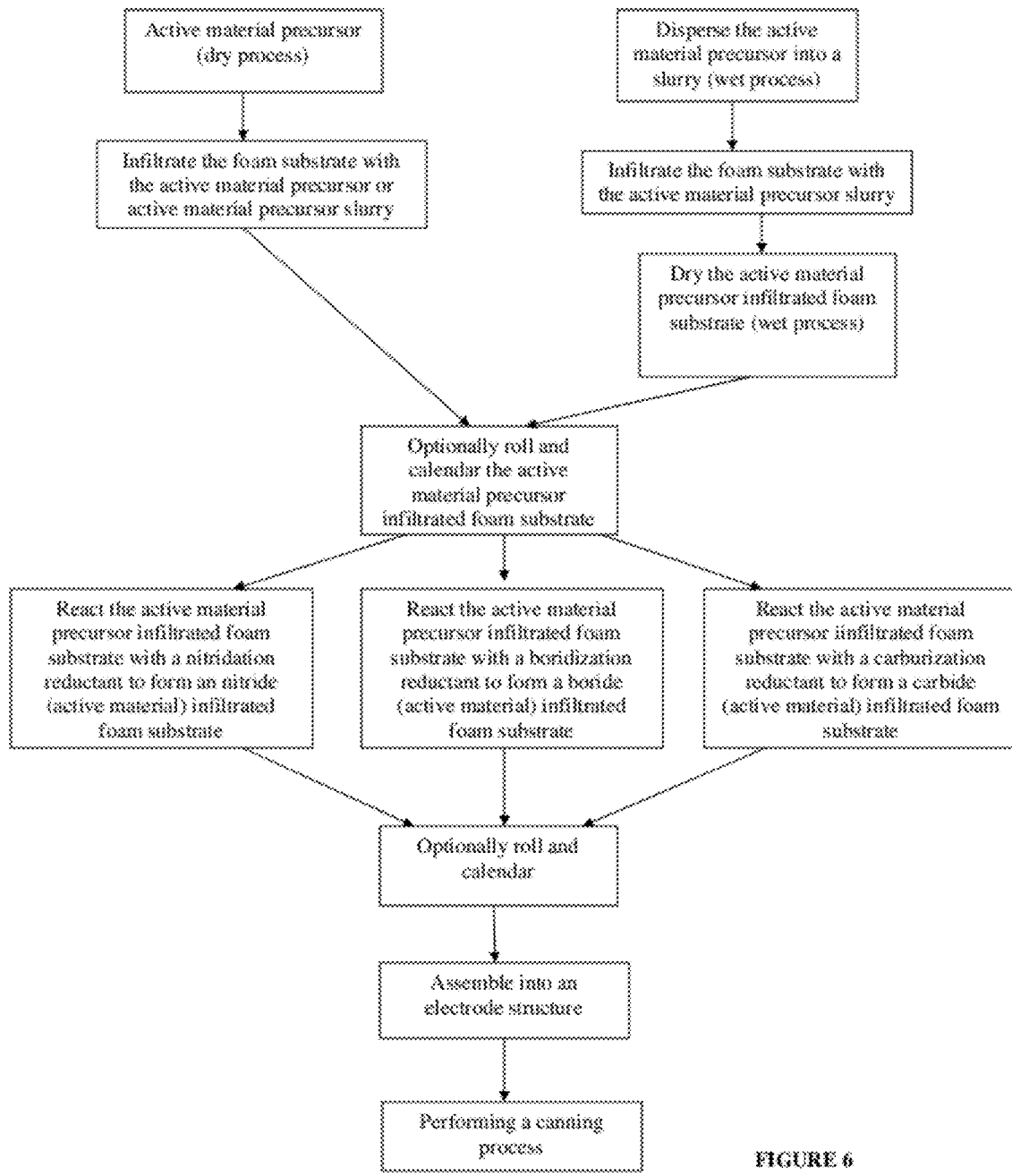
FIG. 6 is a flow chart illustrating a method of forming a transition metal nitride- or carbide-based electrode in accordance with an embodiment of the disclosure.

Referring to FIG. 6, a method of making an electrode can include infiltrating a foam electrode substrate with an active material precursor, and reacting the active material precursor infiltrated foam substrate with a reductant under conditions sufficient to convert the active material precursor to an active material. The foam substrate can be infiltrated with the active material precursor using either a dry or a wet infiltration process. In a dry infiltration process, the active material precursor can be combined with the foam substrate so as to incorporate and disperse the active material precursor into the plurality of pores of the foam substrate.

In a wet impregnation process, the active material precursor can be dispersed into a slurry and the slurry can be applied to the foam substrate. The active material precursor can be dispersed into a slurry, for example, by stirring the active material precursor into a solvent, such as, for example, N-methylpyrrolidione (NMP) along with a polymeric binder, such as for example, polyvinylidenefluoride (PVDF) and graphite. Other suitable solvents include water and alcohol. The slurry can further include a suitable surfactant. When the wet impregnation process is used, the method can further include drying the slurry infiltrated foam substrate. Although this need not be the case, in some examples, it is desired to functionalize as much of the foam substrate as possible, including the entire foam substrate, by infiltrating the active material as deep as possible into the foam substrate. In other examples, less of the foam substrate may be functionalized through active material penetration.

The active material precursor can be a metal powder or a metal oxide. The metal can be a metal of Groups III, IV, V, VI, and VII of the Periodic Table. For example, suitable metals include chromium, molybdenum, tungsten, vanadium, niobium, tantalum, titanium, and zirconium. The resulting active material will be a nitride, an oxynitride, a carbide, an oxycarbide, a boride, or an oxyboride of a metal of Groups III, IV, V, VI, and VII of the Periodic Table. For example, the active material can be vanadium nitride. The active material formed by a method in accordance with an embodiment of the disclosure advantageously has a high surface area. For example, the transition metal nitride, oxynitride, carbide, oxycarbide, boride, and oxyboride active materials can have a surface area of about 40 m²/g.

The active material precursor infiltrated foam substrate is reacted with a suitable reductant to convert the active material precursor to an active material, thereby forming a foam electrode substrate infiltrated with a nitride, an oxynitride, a carbide, an oxycarbide, a boride, or an oxyboride based active material. For example, the precursor can be converted to a nitride, oxynitride, carbide, oxycarbide, boride, or oxyboride by reacting the precursor with a reductant as the temperature is increased. Suitable reductants include, for example, ammonia, hydrazine, nitrogen, methyl amine, methane, ethane, and diborane. For example, where the active material is a nitride or an oxynitride, suitable reductants include ammonia, hydrazine, nitrogen, and combinations thereof. For example, where the active material is to be formed as a carbide or an oxycarbide, suitable reductants include methyl amine, methane, ethane, and combinations thereof. For example, where the active material is to be formed as a boride or an oxyboride, diborane is a suitable reductant.

Hydrogen and/or an inert gas can be added to the reaction to assist the conversion of the precursor material to a nitride. For example, the active material precursor infiltrated foam substrate can be placed in an anaerobic chamber and subjected to a programmed increase in temperature while ammonia gas, hydrogen gas, or nitrogen gas, for example, are passed over the precursor material. The rate of increase in temperature may be linear (for example in a range of about 0° K/hr to about 500° K/hr), for example, or nonlinear but should be uniform without sudden changes in rate. The reaction can be rapidly quenched after completion or held at the final reaction temperature (500° K to 1300° K) for a period of time, and then quenched to room temperature. Optionally, the resulting nitride, oxynitride, carbide, oxycarbide, boride, or oxyboride can be passivated by a stream of 1% oxygen in helium, during cooling.

The method can further include rolling and/or calendaring the active material precursor infiltrated foam substrate prior to and/or after reacting the active material precursor infiltrated foam substrate with a reductant under conditions sufficient to convert the active material precursor to an active material. Calendering can also be performed on foams infiltrated with an active material pre-formed before incorporation into the foam substrate. Calendering can advantageously remove bubbles from within the foam substrate and improve contact between the active material and the foam struts. Calendering also decreases the porosity of the foam substrate.

Further processing can include cutting the active material infiltrated foam substrate to a suitable size and assembling the active material infiltrated foam substrate into a suitable electrode structure. Assembling the electrode structure can include, for example, stacking the active material infiltrated foam substrate with a counter electrode and a separator, rolling the electrode structure, attaching a tap attachment, and/or canning the electrode structure.

Figure 7:
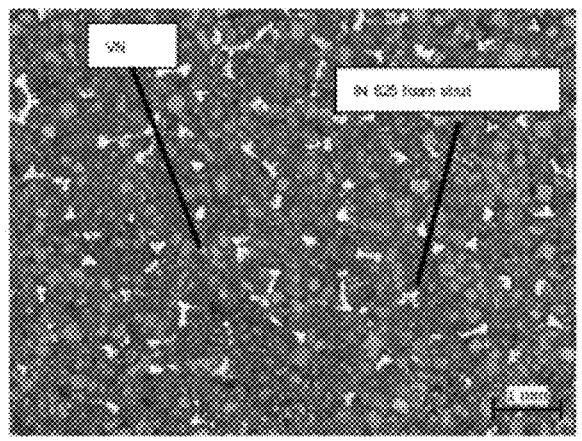
FIG. 7 is a scanning electron micrograph illustrating a VN infiltrated foam substrate in accordance with an embodiment of the disclosure.
Figure 8:
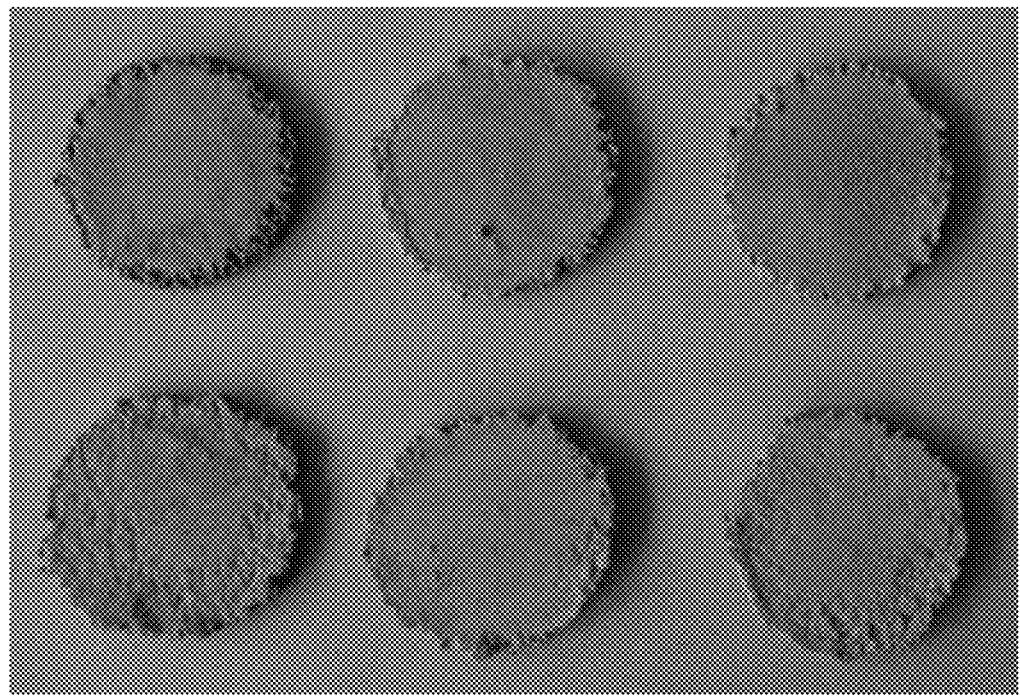
FIG. 8 is an optical image of $V_2O_5$-powder slurry infiltrated 1200 μm pore size foam disks of 16 mm diameter, before nitride synthesis in accordance with an embodiment of the disclosure.
Figure 9A:
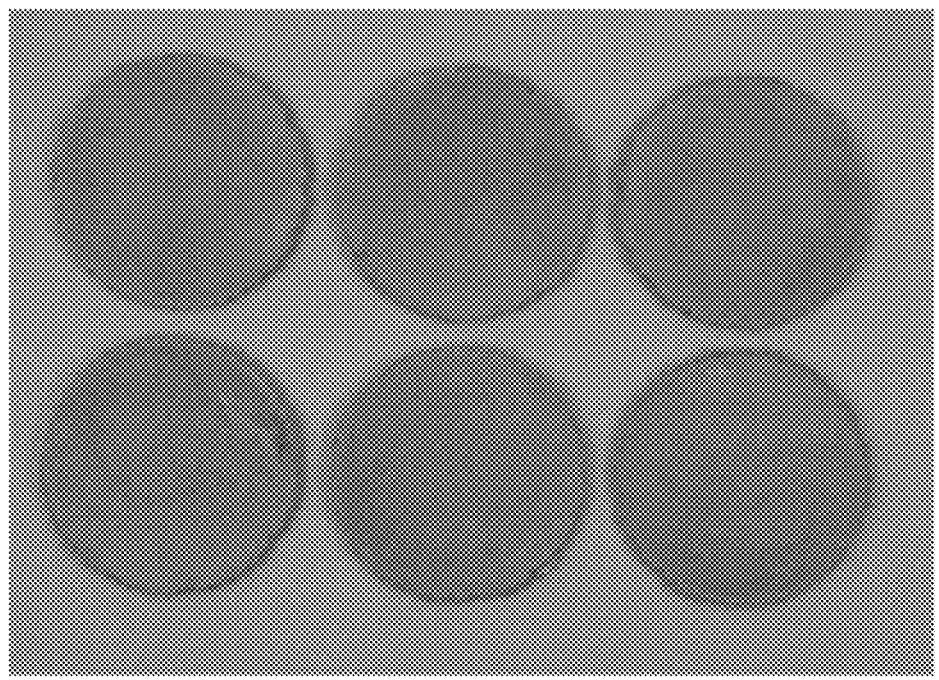
FIG. 9A is an optical image of $V_2O_5$-powder slurry infiltrated 450 μm pore size foam disks of 16 mm diameter, before nitride synthesis in accordance with an embodiment of the disclosure.
Figure 9B:
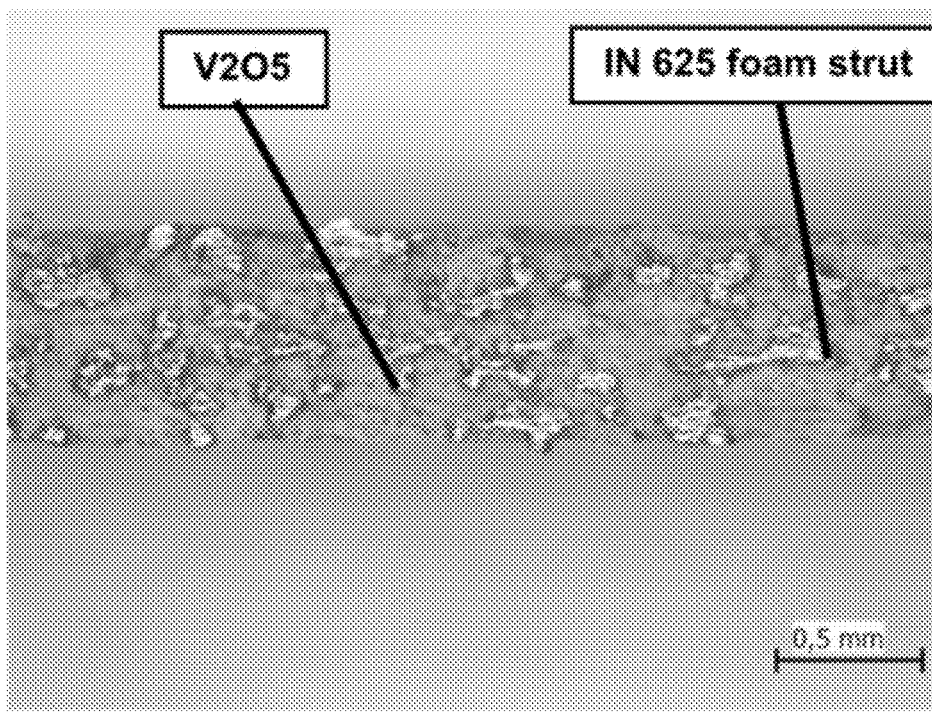
FIG. 9B is a cross section of the disk of 9A illustrating complete infiltration of the $V_2O_5$-powder through the foam volume.

FIG. 7 is a scanning electron micrograph illustrating the surface of a VN infiltrated foam substrate. The foam substrate shown in FIG. 7 is an alloy in accordance with IN625 of Table 1 and had a pore size of about 1200 microns. The VN infiltrated foam was calendered 27% and had a filling ratio of VN of 74 wt. %. FIG. 8 is an optical image of a foam substrate infiltrated with $V_2O_5$-powder prior to nitride synthesis and after 50% calendering. The foam substrate is an alloy in accordance with IN625 of Table 1 and has a pore size of about 1200 micron. The filling ratio of $V_2O_5$ is about 79 wt. %. FIG. 9A is an optical image of a foam substrate infiltrated with $V_2O_5$-powder prior to nitride synthesis and after 50% calendering. The foam substrate is an alloy in accordance with IN625 of Table 1 and had a pore size of about 450 micron. The filling ratio of $V_2O_5$ is about 55 wt. %. FIG. 9B is a cross section of the disk samples of FIG. 9A, illustrating complete infiltration of the foam volume with the active material precursor ($V_2O_5$).

Figure 10:
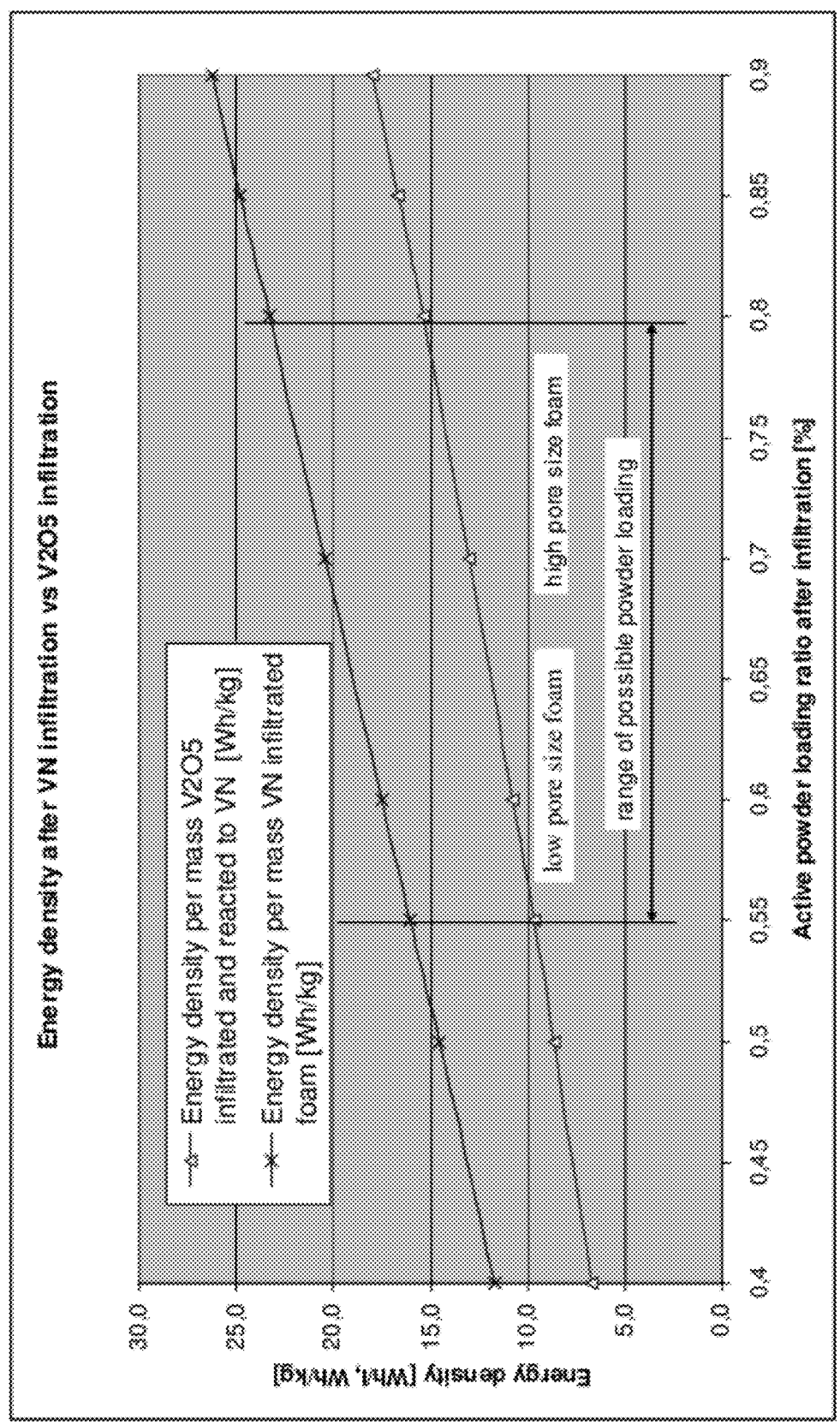
FIG. 10 is a graph illustrating the correlation between active powder loading ratio and energy density for electrodes in accordance with embodiments of the disclosure.

The correlation between the active powder loading value and the obtainable energy densities is shown in FIG. 10. In the upper curve the energy density using VN powder (transformed from $V_2O_5$ to VN separately before infiltration) is given. The lower curve demonstrates the energy densities using $V_2O_5$ powder for infiltration with an enclosed synthesis to VN. The lower energy densities for the same filling ratio are the result of weight loss during the reaction from $V_2O_5$ to VN by a factor 0.714. The range of possible powder loading depends on one hand on the powder slurry composition (amount of solvent and binder) and on the other hand on the foam morphology. The foam substrate, with a pore size of 1200 μm, has a lower strut density and can absorb more powder slurry compared to a foam substrate having a pore size of 450 μm. On the other side a higher strut density can bear higher currents.

In one embodiment of the method of making the electrodes, a transition metal can be oxidized to transform the metal into oxide in an air furnace. During oxidation, it is believed that the material volume is reduced and micro cracks and pores are induced, which leads to high specific surface area powders. In another embodiment, a transient metal oxide powder, such as $V_2O_5$ powder can be nitrided before the infiltration step. FIG. 2 shows a vanadium powder, which was nitride under $NH_3$ to vanadium nitride, and illustrates the high micro porosity of the VN powder. The porous powder structure provides a high specific surface area, which can provide high double layer and pseudo capacitance. The VN had a pore size of about 125-250 μm. A specific surface area BET of 12.5 $m^2/g$ was measure for the powder of FIG. 2. The specific surface area can be increased to about 38 $m^2/g$, for example, by adjusting synthesis conditions. For example, the space velocity (i.e., the flow rate divided by the mass of the material) can be adjusted.

Figure 11A:
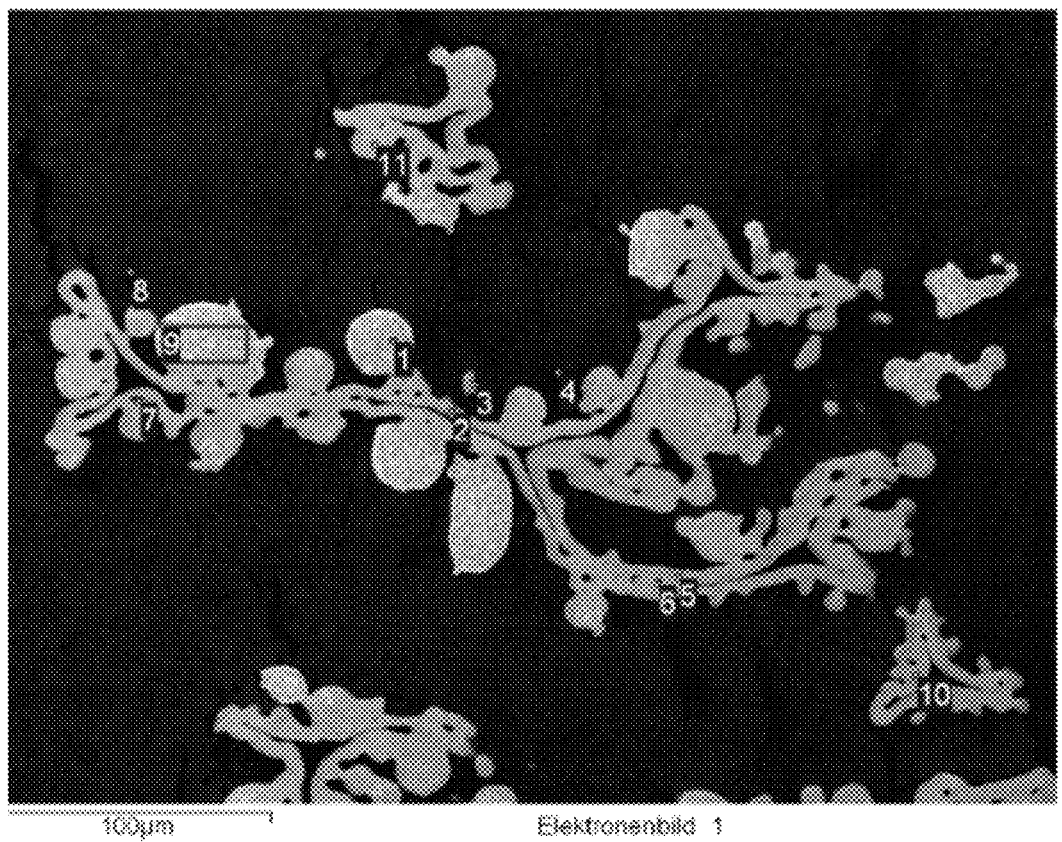
FIG. 11A is a back scatter scanning electron microscopy image of the IN625 foam having VN infiltrated therein in accordance with an embodiment of the disclosure, with elemental analysis (shown in the table)
Figure 11B:
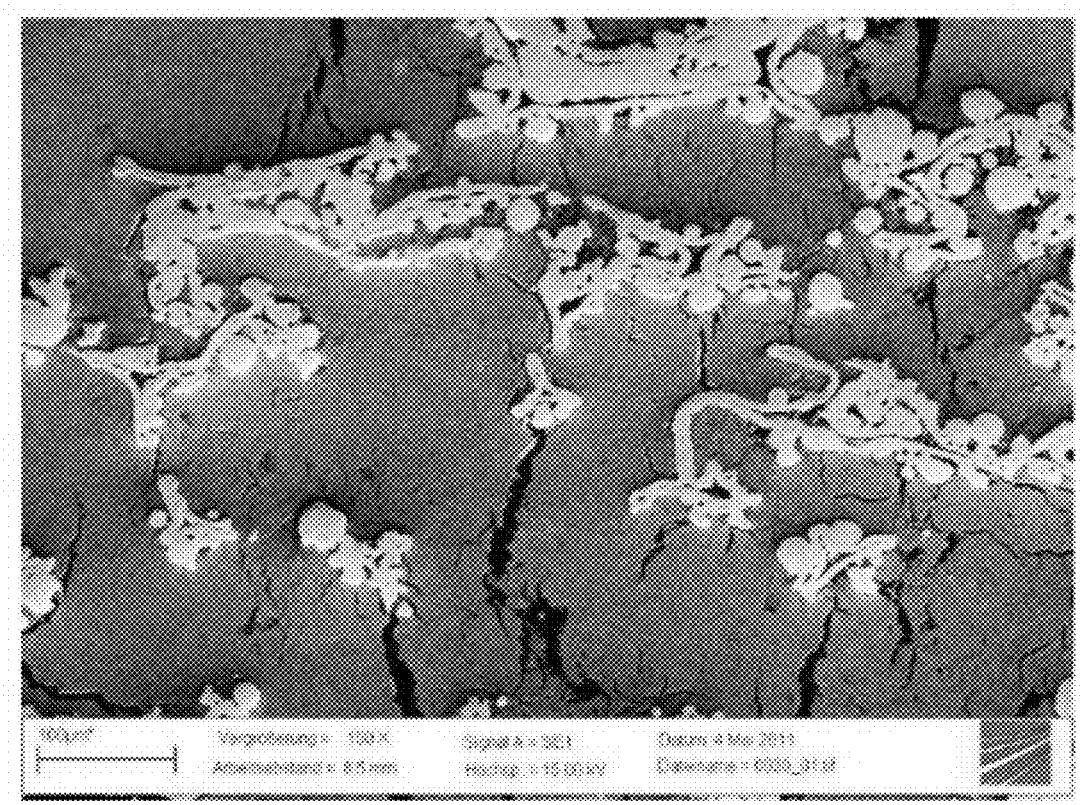
FIG. 11B is a secondary electron scanning electron microscopy image of the foam electrode of FIG. 11A for topography imaging.

In yet another embodiment, an oxide powder from a transition metal can be infiltrated into the foam substrate. FIGS. 8 and 9 illustrate a $V_2O_5$ powder infiltrated foam substrate. The oxide can be transformed under $NH_3$ atmosphere to transform the oxide to a nitride. For example, the samples of FIGS. 8 and 9 were heat treated under $NH_3$ to transform the vanadium oxide into vanadium nitride. The cross section of the foam electrode after synthesis in FIG. 11 shows that VN is well connected with the foam struts. The foam substrate of the electrode of FIG. 11 is consistent with the IN 625 foam of Table 1. Such foam electrodes can advantageously have low electrical internal resistance and therefore high power density. The EDX element analysis (the results of which are in the table of FIG. 11 demonstrates that the IN 625 foam composition is not affected by the synthesis. FIG. 11A is a back scatter scanning electron microscopy image of the IN 625 foam electrode having a foam substrate with a pore size of 450 microns, after nitride synthesis and conversion of the $V_2O_5$ powder to VN, with elemental analysis (shown in the table). FIG. 11B is a secondary electron scanning microscopy image for topography imaging. Furthermore, it was confirmed by bending test of the initial IN625 foam substrate and the foam electrode after the syntheses of the active material that there was no loss of mechanical strength, which is important for the stability of the electrode material.

Figure 12:
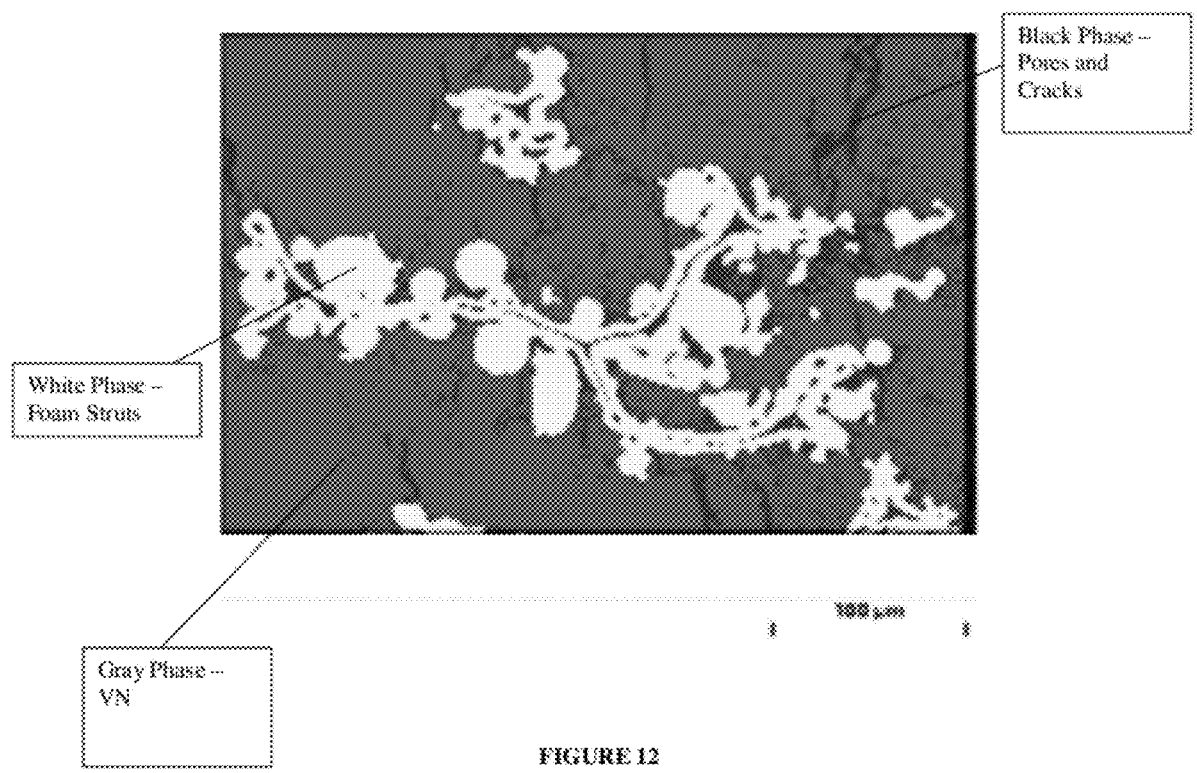
FIG. 12 is an image analysis of the electrode of FIG. 11A, illustrating the phase fractions of the electrode.

FIG. 12 shows the results of image analyses to determine the phase fractions of the electrode material (i.e., foam substrate infiltrated with active material) of FIG. 11. The remaining (unfilled) porosity of only 8.5% indicates that the active material nearly fully infiltrated the foam. The active material (VN) was about 68.9% of the electrode, while the foam struts (IN 625) was about 22.6% of the electrode. The electrode of FIG. 12 was calendered over 50% after infiltration (from 1.6 mm to 0.75 mm thickness). The initial foam morphology with 90% porosity and 10% strut volume was changed by calendering to a higher strut density, which increases the electrode weight, but also can increase the current density. The black phase of FIG. 12 represents the pores and cracks of the foam substrate, which comprised about 8.5% of the electrode. The white phase of FIG. 12 represents the foam struts, which comprised about 22.6% of the electrode. The gray phase represents the vanadium nitride, which comprised about 68.9% of the electrode.

Figure 13:
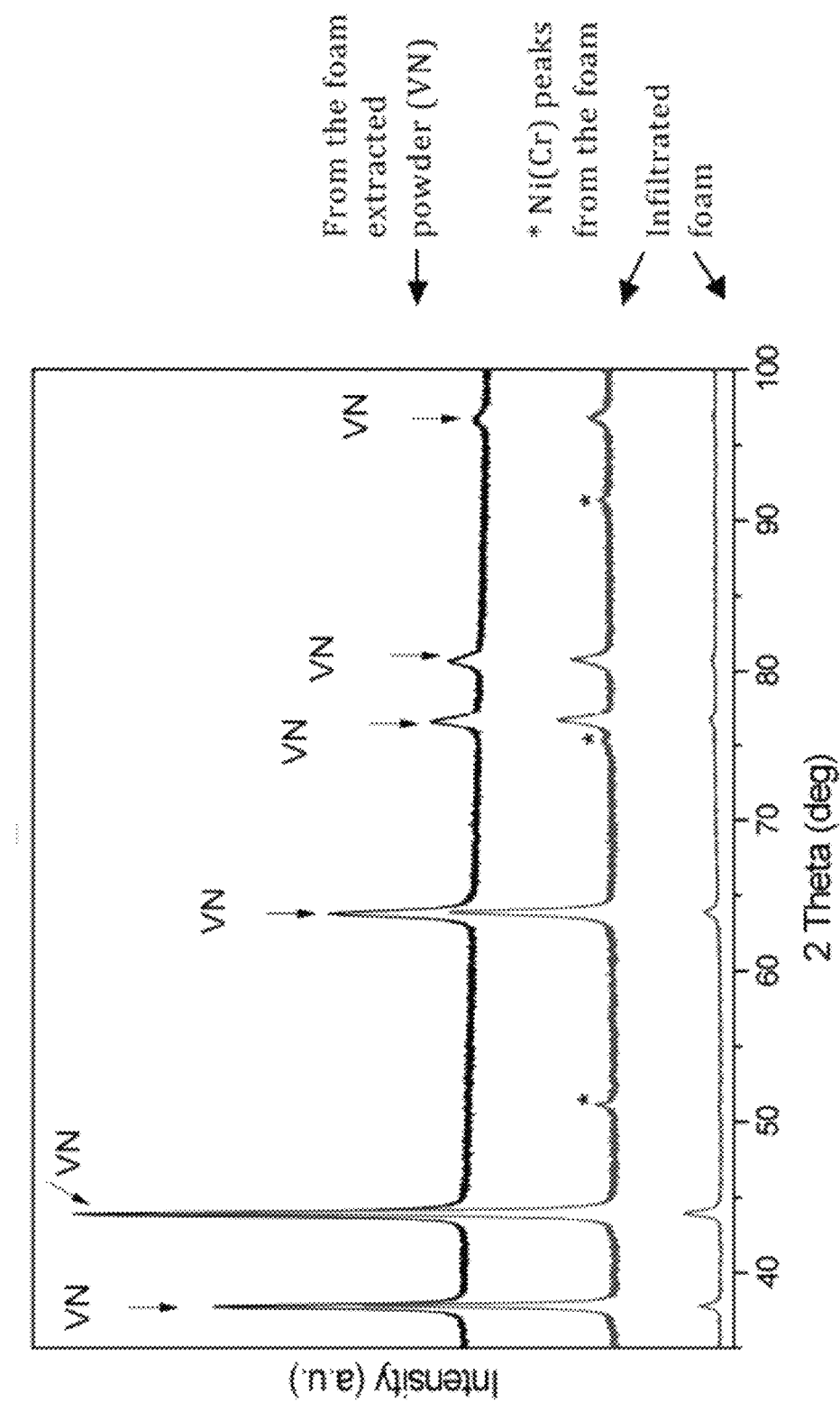
FIG. 13 is a graph of an x-ray diffraction (XRD) analysis of the phases of FIG. 12, illustrating complete transformation of the $V_2O_5$ powder to VN.

To analyse the reacted phases after the nitride synthesis the foam electrode material was characterized by XRD measurement. The XRD pattern in FIG. 13 demonstrates the complete transformation of $V_2O_5$ to VN. The main peaks indicate only VN. No residual $V_2O_5$ was detected. The crystallite sizes are consistent with high surface area materials. The XRD was carried out at a scan rate of 5.0° min$^{-1}$ with a step size of 0.1° over a 2θ range of 10° to 90°. The software used for peak identification was JADE 7.0 that has the International Centre for Diffraction database built-in for phase identification.

In an embodiment, vanadium, molybdenum and tungsten carbides and nitrides were synthesized via temperature programmed reaction (TPR) in a carburizing atmosphere of 15% $CH_4/H_2$ for carbides and a nitriding atmosphere of anhydrous $NH_3$ for the nitrides. As these materials are pyrophoric, after the synthesis the materials were quenched to room temperature and then exposed to 1% $O_2$/He in order to form a monolayer of protective oxide layer.

Figure 14:
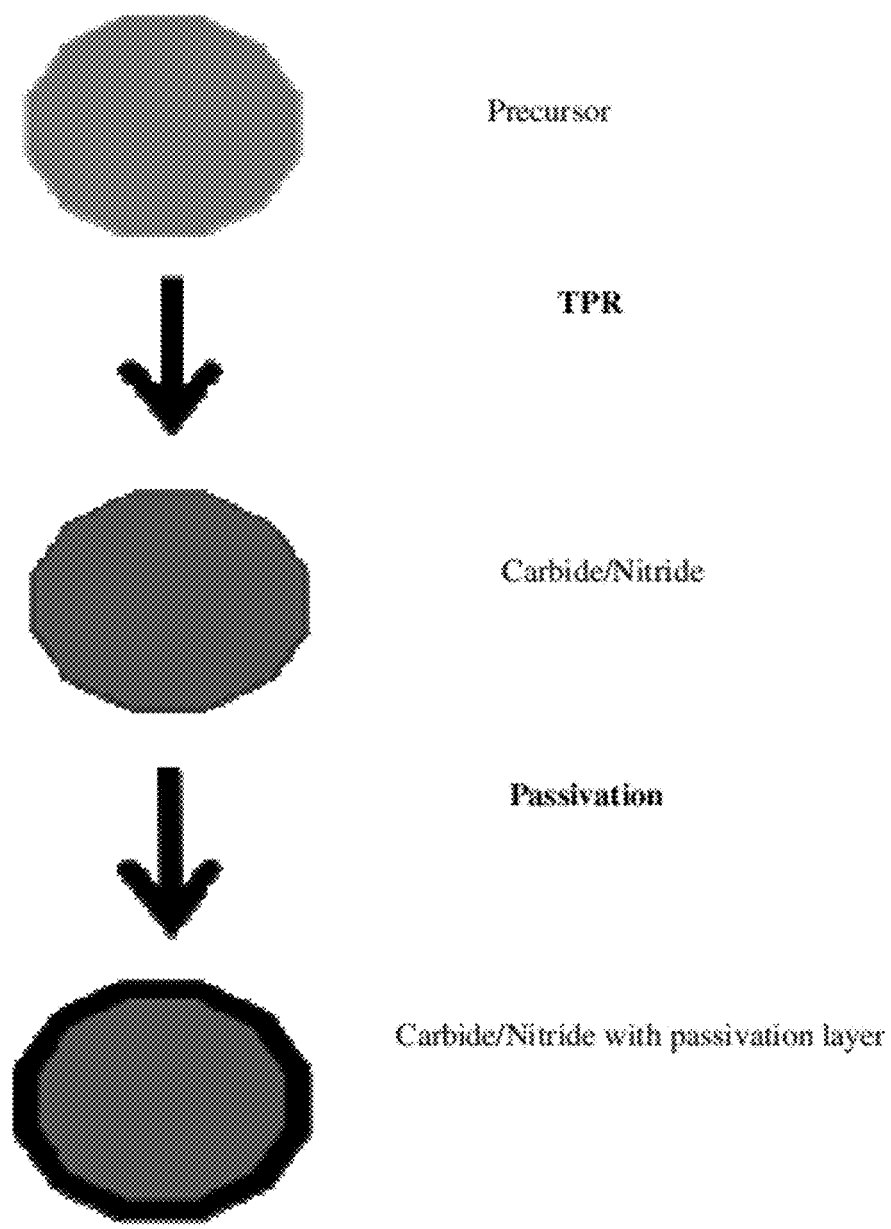
FIG. 14 is a schematic illustrate of a transition metal-carbide and -nitride synthesis in accordance with an embodiment of the disclosure.

FIG. 14 is a schematic illustrate of a transition metal-carbide and -nitride synthesis.

Figure 15:
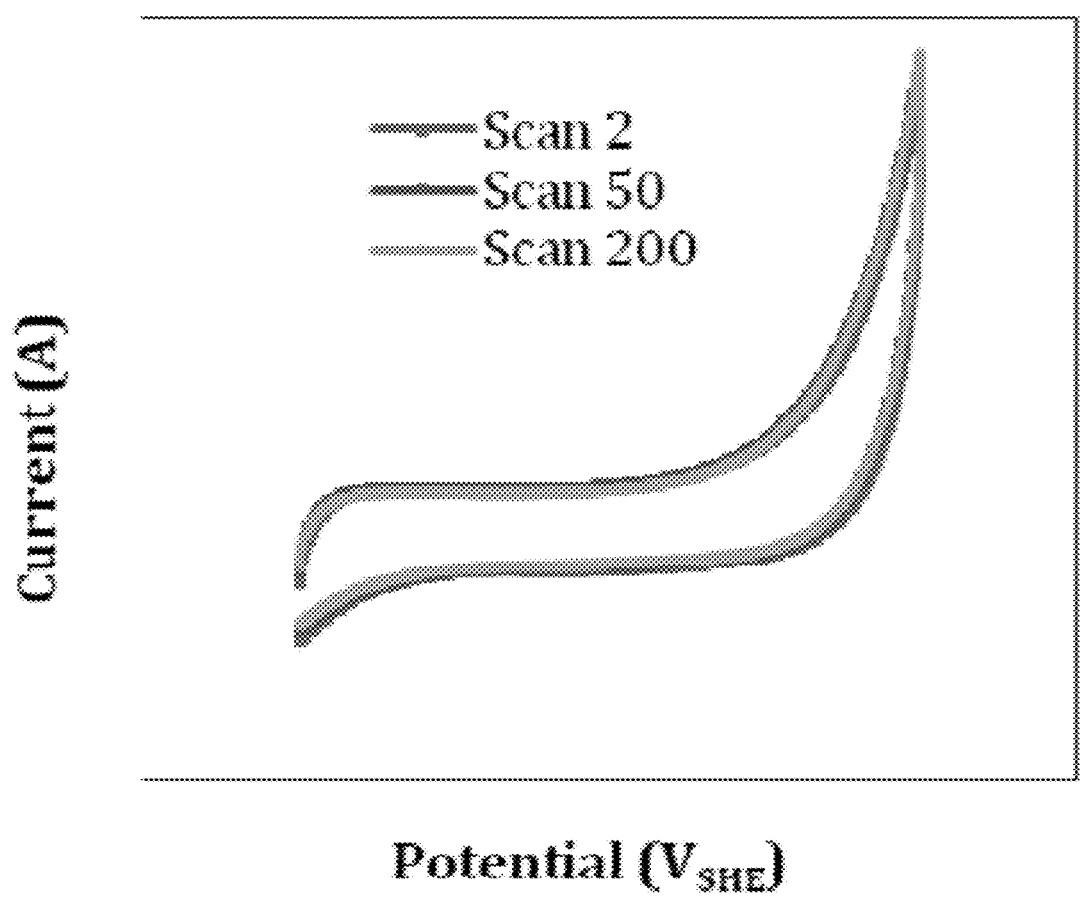
FIG. 15 is a cyclic voltammogram of IN625 foam in 30% KOH in accordance with an embodiment of the disclosure.
Figure 16:
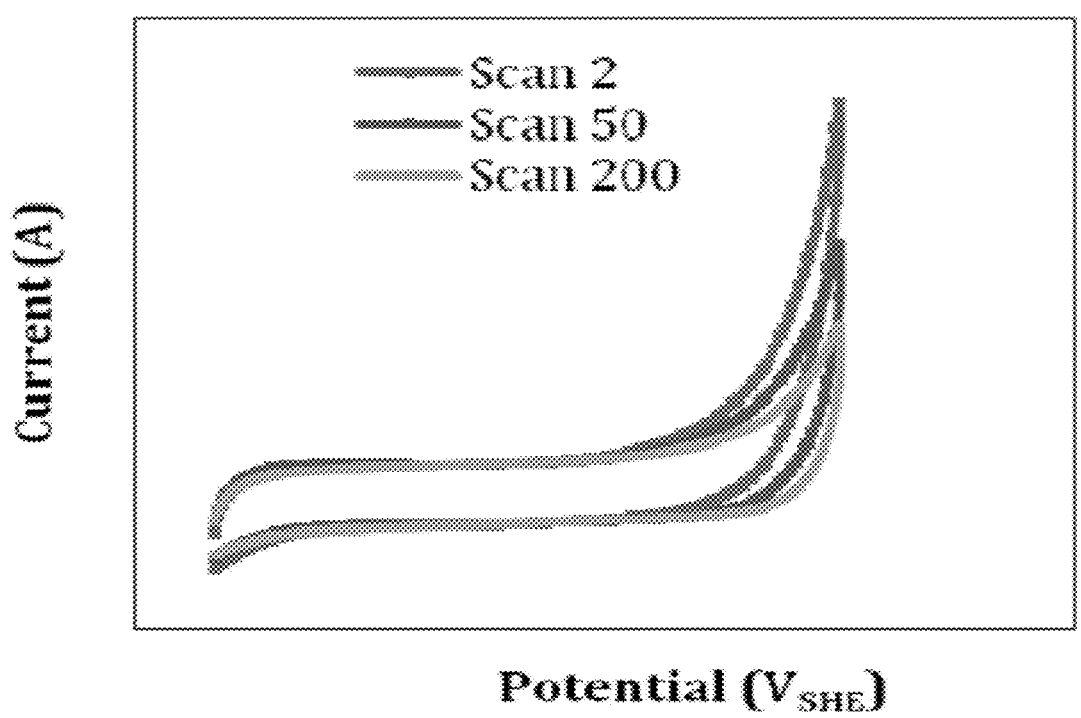
FIG. 16 is a cyclic voltammogram of a Fe#2 foam in 30% KOH in accordance with an embodiment of the disclosure.

Cyclic voltammetry experiments were conducted on the alloy foams to determine their stability. The foams were found to be more stable with wider voltage windows in the basic (KOH) electrolyte solutions compared to acidic ($H_2SO_4$) electrolyte solutions. Foam IN625 (763) and Fe#2 (846) were found to be the most stable with the widest stability window of 0.8V. FIGS. 15 and 16 show the cyclic voltammograms of foams IN625 and Fe#2.

Based on the results for stability and capacitance measurement experiments VN in KOH and $Mo_2N$ in $H_2SO_4$ were found to be the most stable systems with the highest capacitances. The foam substrate IN 625 had a better stability in KOH, and thus would be well-paired with an active material having stability in an alkaline system, such as VN. Also VN had a wide stability window and hence would have a high energy density as the energy density is given by Equation 1:

$$E = \frac{1}{2}CV^2. \quad \text{Equation 1}$$

Figure 17:
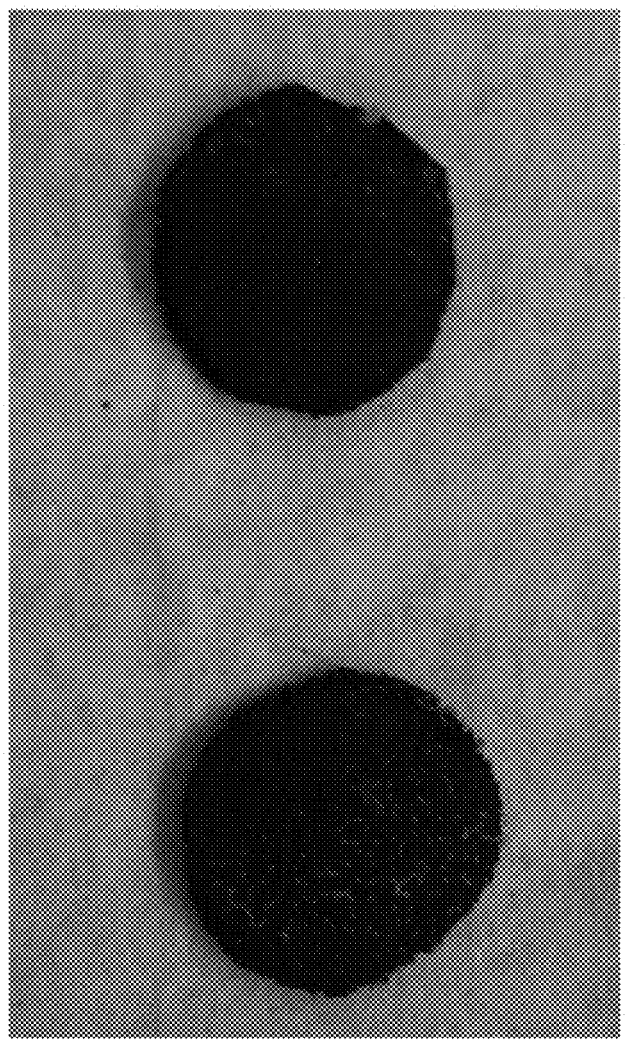
FIG. 17 is an image of disc electrodes infiltrated with $V_2O_5$ powder after nitridation using anhydrous $NH_3$ to convert the $V_2O_5$ powder to VN, in accordance with an embodiment of the disclosure.

VN-alloy foam electrodes were prepared by nitridation of the $V_2O_5$ infiltrated alloy foam electrode. FIG. 17 is an image of the disc electrodes after nitridation using anhydrous $NH_3$. The nitridation was carried out in a temperature-programmed manner and was followed by passivation in 1% $O_2$/He gas mixture at room temperature as the active material was pyrophoric. X-ray diffraction confirmed that $V_2O_5$ that was infiltrated into the alloy foam was converted to VN.

Figure 18A:
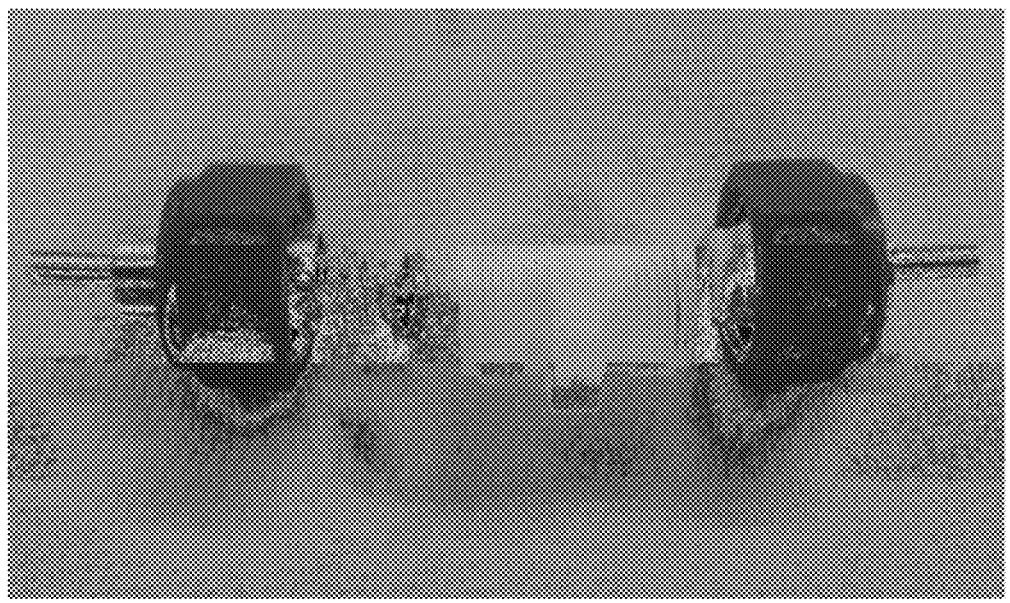
FIG. 18A is an image of a Swagelok cell formed using disc electrodes having VN-foam electrodes in accordance with embodiments of the disclosure.
Figure 18B:
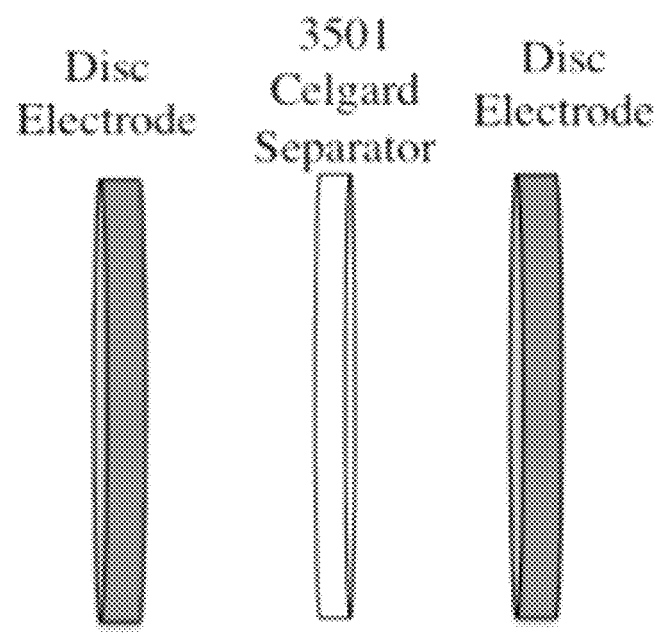
FIG. 18B is a schematic illustrate of the symmetric cell structure of the cell of FIG. 18A.

In order to measure the performance of the VN-alloy foam electrodes, constant-current charge-discharge experiments were carried out in a Swagelok cell (FIG. 18A). Referring to FIG. 18B, a symmetric supercapacitor was prepared by pairing two VN-alloy foam electrodes, Celgard 3501 was used as the separator and 1M KOH aqueous solution was used as the electrolyte solution. The charge-discharge experiments were carried out at a current of 1 mA. The disc electrodes had the area of 2.85 cm$^2$.

Figure 19A:
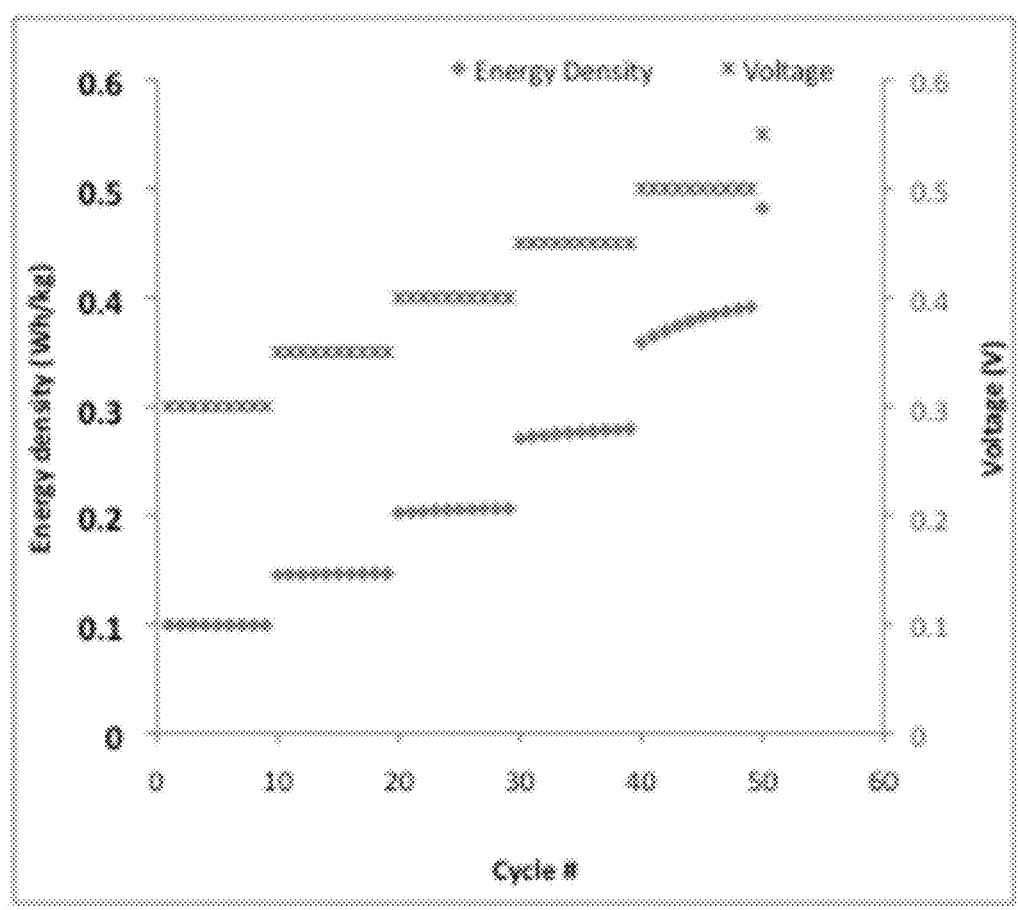
FIG. 19A is a graph of energy density (Wh/kg active materials) and voltage (V) as a function of cycle number for the cells of FIG. 18A.
Figure 19B:
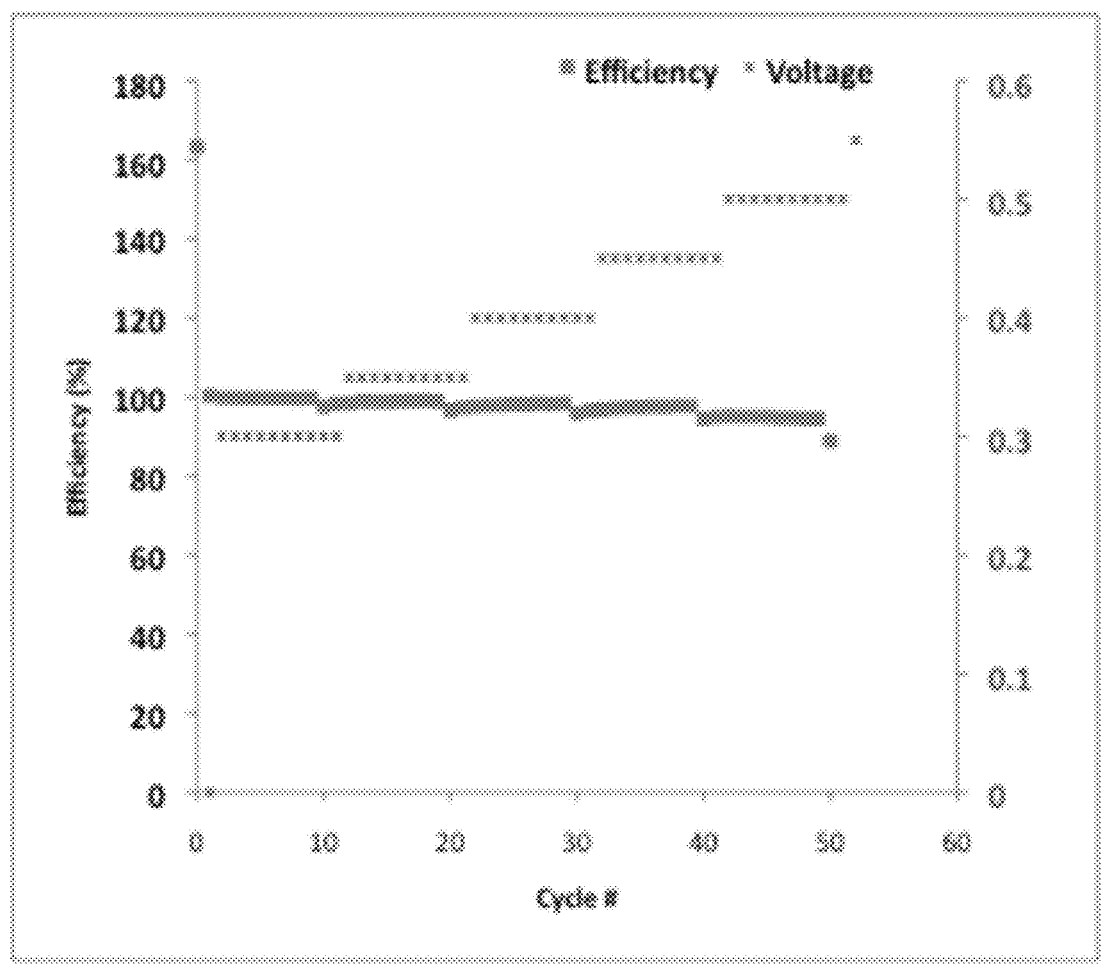
FIG. 19B is a graph of efficiency and Voltage (V) as a function of cycle number for the cells of FIG. 18A.
Figure 20A:
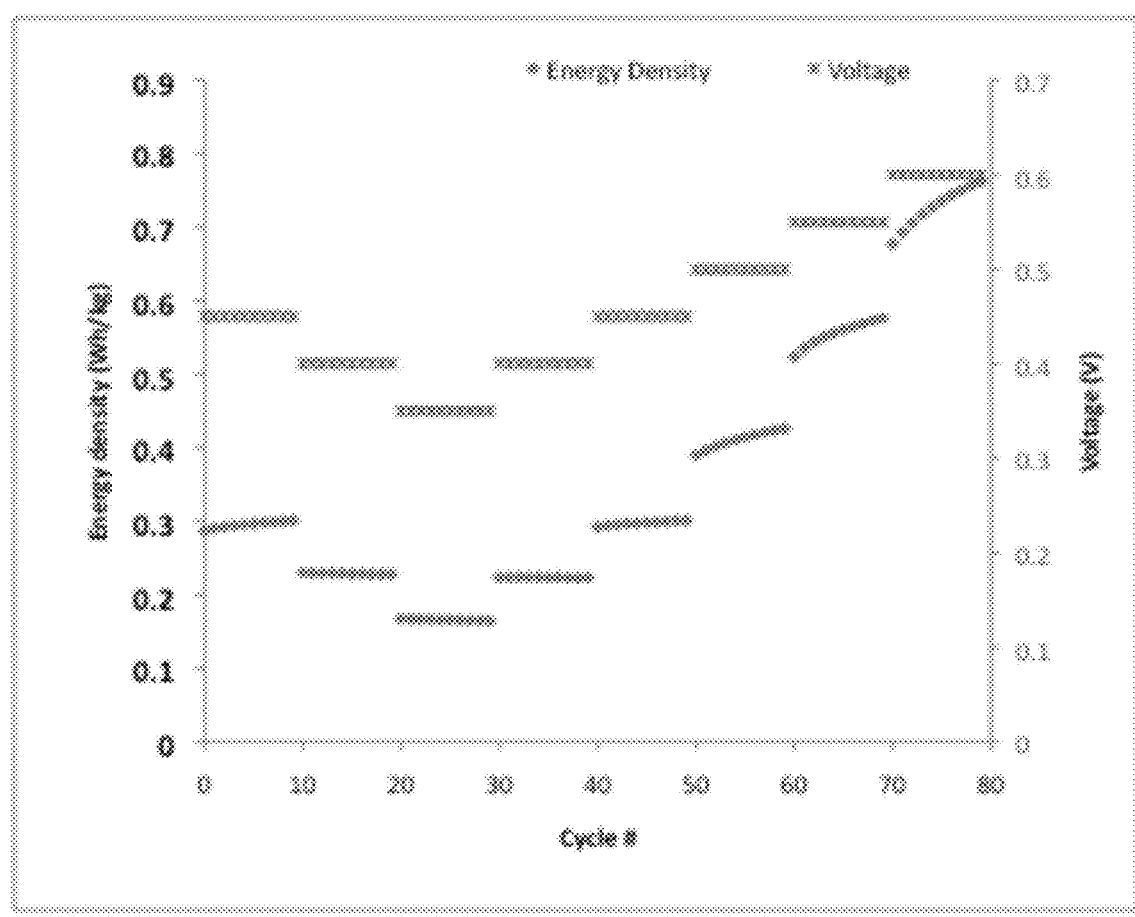
FIG. 20A is a graph of energy density (Wh/kg active materials) and Voltage (V) as a function of cycle number for the cells of FIG. 18A, illustrating the reversibility of the cells.
Figure 20B:
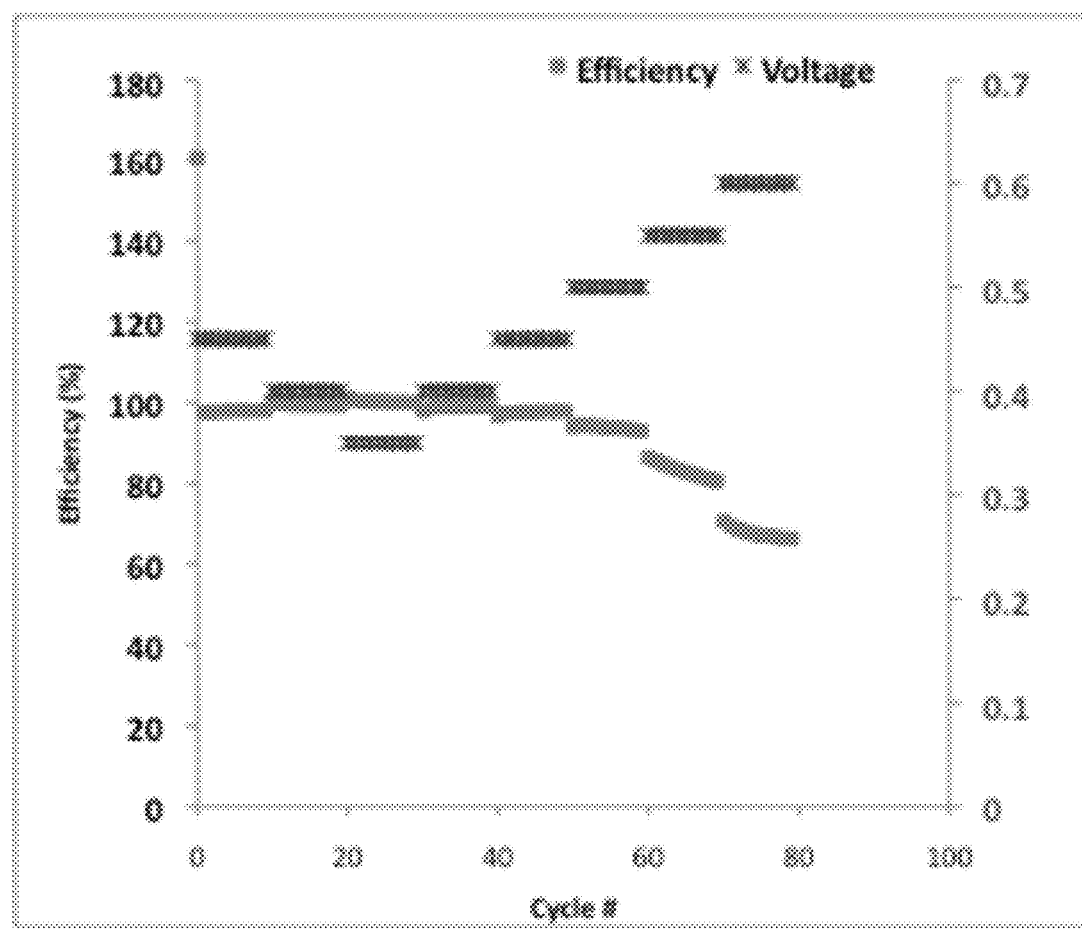
FIG. 20B is a graph of efficiency and Voltage (V) as a function of cycle number for the cells of FIG. 18A, illustrating the reversibility of the cells.

To determine the operating voltage of the system, charge-discharge experiments were carried out by increasing the charge voltage from 0.3V to 0.6V with increments of 0.05V. The discharge voltage was set at 0.1V. Capacitance and energy density of the system was estimated on the based mass of active material and efficiency of the system was calculated (FIGS. 19A and 19B). Similarly, charge voltage of the system was decreased from 0.5V to 0.35V to confirm the reversibility of the changes made on the active material during the test (FIGS. 20A and 20B). Based on the results of these experiments 0.55V was used as the charging voltage and 0.1V was used as the discharging voltage.

The alloy foam substrate prior to infiltration can have a higher degree of design flexibility. It can be cut, shaped by rolling, pressing or calendering. After infiltration of the pore volume and drying the shaping properties are limited. On the other hand, powder infiltration after shaping may be difficult. The infiltrated electrode material can be shaped in a wet state.

Figure 21A:
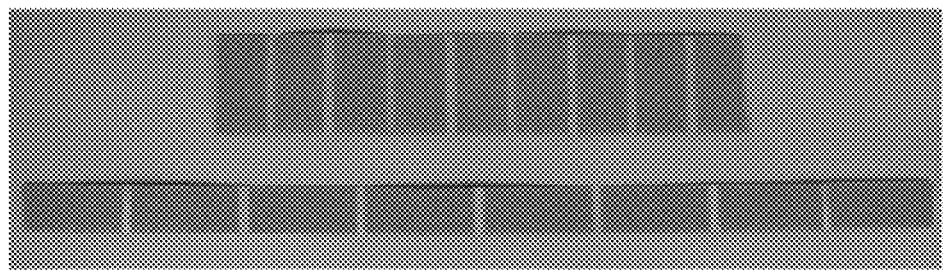
FIG. 21A is an image of an electrode design in accordance with an embodiment of the disclosure.
Figure 21B:
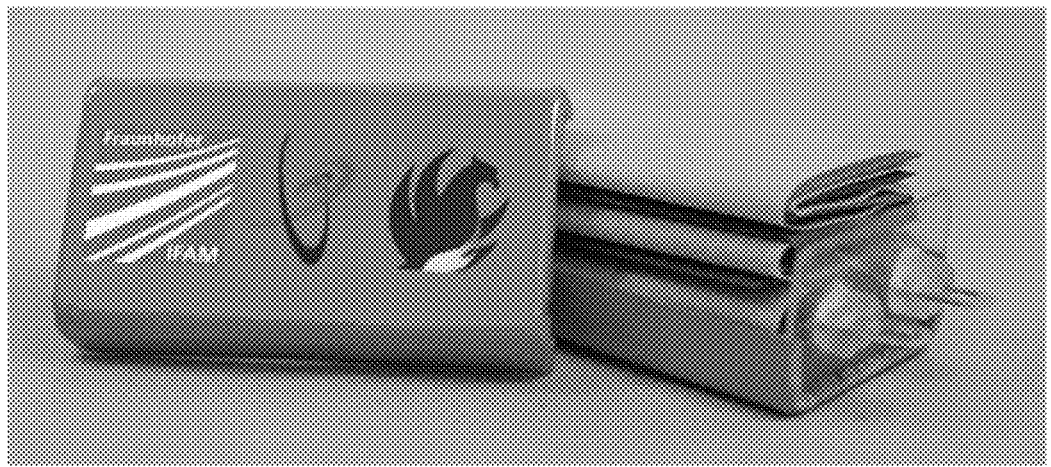
FIG. 21B is an image of an assembly of electrodes in accordance with an embodiment of the disclosure.

Supercapacitor designs can also be based on flat sheets, which can be folded as electrodes into one another insulated with the separating foil (see FIG. 21). The advantage of such a design is that no additional conducting of several layers is needed. Only the two ends of the electrodes have to be connected. To improve the bendability notches can be pressed in the foam. The compressed areas can have a thickness of about 100 μm, like a flexible foil. The areas between the pressed sections can be infiltrated with the active material. Afterwards the electrode can be bent along the pressed lines and the two electrodes can be separated by an insulating porous polymer film wetted with electrolyte. All the parts can then be assembled.

The energy densities of a supercapacitor in accordance with embodiments of the disclosure can be calculated using the following values, for example:

Total weight of the supercapacitor: $m_T$=41.36 g

Total area of foam electrodes 450 μm: A=17136 mm$^2$ (thickness 0.75 mm)

Area density of foam infiltrated+VN synthesis: ρ=0.0017578 g/mm$^2$

Total electrode weight: m=30.12 g

Filling ratio for $V_2O_5$ in 450 μm pore size foam: 55%.

The mass of $V_2O_5$ precursor material in the foam electrode can be calculated as follows:

$$m_{V2O5}=30.12 \text{ g}*55\%=16.567 \text{ g}.$$

Because there is a loss of the molar mass during reaction of $V_2O_5$ to VN ($V_2O_5 \rightarrow 181,88$ g/mol; 2VN$\rightarrow$129,9 g/mol) the weight of the active material is reduced by factor 0.714. Thus, the mass of the infiltrated VN is calculated by:

$$m_{VN}=m_{V2O5}*0.714=16.567 \text{ g}*0.714=11.829 \text{ g}.$$

The capacitance of 11.829 g VN can be calculated as follows:

$$C=m_{VN}*C_{VN} \text{ (for VN 210 F/g measured value)}$$

$$C=11.829 \text{ g}*210 \text{ F/g}=2484.09 \text{ F}.$$

Energy for the supercapacitor can be calculated as follows:

$$E=\tfrac{1}{2}C*V^2 \text{ (V=Voltage, assumption of 1V; C=Capacitance)}$$

$$E=\tfrac{1}{2}*2484.09 \text{ F}*(1 \text{ V})^2=1242.05 \text{ AS/V}*V^2$$

$$E=0.345 \text{ Wh (for 41.36 g supercapacitor)}.$$

Energy density (Wh/kg) can then be calculated as follows:

$$E_d=0.345 \text{ Wh}/41.36 \text{ g}*1000 \text{ g}=8.34 \text{ Wh/kg}.$$

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed:

1. An electrode comprising:
   a foam substrate comprising a plurality of pores; and
   an active material infiltrated throughout the foam substrate and disposed within the plurality of pores, wherein the active material comprises any of a metal nitride, a metal oxynitride, a metal carbide, a metal oxycarbide, a metal boride, a metal oxyboride, and combinations thereof, and wherein the metal is selected from the group consisting of Groups III, IV, V, VI, or VII of the Periodic Table, and the active material is electrically coupled with the foam substrate.

2. The electrode of claim 1, wherein the foam substrate comprises a metal selected from the group consisting of Group IV, V, VI, VII, and VIII of the Periodic Table.

3. The electrode of claim 1, wherein the foam substrate comprises a material selected from the group consisting of nickel, nickel alloys, copper, copper alloys, carbon, and combinations thereof.

4. The electrode of claim 1, wherein the active material comprises vanadium nitride.

5. The electrode of claim 1, wherein the foam substrate has a pore size of about 50 microns to about 4000 microns.

6. The electrode of claim 1, wherein the foam substrate has a pore size of about 450 microns to about 1200 microns.

7. The electrode of claim 1, wherein the foam substrate has a pore size of about 580 microns to about 800 microns.

8. The electrode of claim 1, wherein the foam substrate comprises struts having a length of between 50 microns and 4000 microns.

9. The electrode of claim 1, wherein the electrode comprises about 30 wt % to about 95 wt % of active material, based on the total weight of the electrode.

10. The electrode of claim 1, wherein the active material has a particle size of about 0.5 microns to about 500 microns.

11. The electrode of claim 1, wherein the foam substrate is calendered up to about 80%.

12. The electrode of claim 1, wherein prior to infiltration of the active material, the foam substrate has a porosity of about 25% to about 98%.

13. The electrode of claim 1, wherein prior to infiltration of the active material, the foam substrate has a porosity of about 90% to about 95%.

14. The electrode of claim 1, wherein the foam substrate has a thickness of about 0.2 mm to about 4 mm.

15. A supercapacitor comprising
   the electrode of claim 1;
   a counter electrode;
   a separator; and
   an electrolyte,
   wherein the supercapacitor having a symmetric configuration.

16. The supercapacitor of claim 15, wherein the electrolyte is an aqueous electrolyte.

17. A supercapacitor comprising:
   the electrode of claim 1;
   a counter electrode;
   a separator; and
   an electrolyte,
   wherein the supercapacitor having an asymmetric configuration.

18. A supercapacitor of claim 17, wherein the counter electrode comprises an active material selected from the group consisting of manganese oxide, ruthenium oxide, nickel oxyhydroxide, and cobalt oxide.

19. The supercapacitor of claim 17, wherein the electrolyte is an aqueous electrolyte.

20. A method of making an electrode, the method comprising:
   impregnating a foam substrate with an active material precursor, wherein the foam substrate includes a plurality of pores and the active material precursor is dispersed into the foam substrate such that it becomes disposed within the pores; and
   reacting the active material precursor infiltrated foam substrate with a reductant under conditions sufficient to convert the active material precursor to an active material, wherein the active material comprises a metal nitride, a metal oxynitride, a metal carbide, a metal oxycarbide, a metal boride, a metal oxyboride, and combinations thereof, and wherein the metal is selected from Groups III, IV, V, VI, or VII of the Periodic Table, and the active material is electrically coupled to the foam substrate.

21. The method of claim 20, wherein the reductant is selected from the group consisting of ammonia, hydrazine, nitrogen, and combinations thereof, and the active material is a nitride or an oxynitride of a metal selected from Groups III, IV, V, VI, or VII of the Periodic Table.

22. The method of claim 20, wherein the reductant is selected from the group consisting of methyl amine, methane, ethane, and combinations thereof, and the active material is a carbide or an oxycarbide of a metal selected from Groups III, IV, V, VI, or VII of the Periodic Table.

23. The method of claim 20, wherein the reductant is diborane and the active material is a boride or an oxyboride of a metal selected from Groups III, IV, V, VI, or VII of the Periodic Table.

24. The method of claim 20, wherein the active material precursor is a metal powder or a metal oxide, and the metal is selected from Groups III, IV, V, VI, or VII of the Periodic Table.

25. The method of claim 20, wherein the foam substrate comprises a metal selected from the group consisting of Group IV, V, VI, VII, and VIII of the Periodic Table.

26. The method of claim 20, wherein the foam substrate comprises a material selected from the group consisting of nickel, nickel alloys, copper, copper alloys, carbon, and combinations thereof.

27. The method of 20, wherein impregnating the foam substrate comprises dispersing the active material precursor into a slurry and applying the slurry to the foam substrate.

28. The method of claim 20, wherein the foam substrate has a thickness of about 0.2 mm to about 4 mm.

29. The method of claim 20 further comprising calendaring the foam substrate after reacting the active material precursor infiltrated foam substrate to convert the active material precursor to the active material.

30. The method of claim 29, wherein the foam is calendered up to about 80%.

31. The electrode of claim 1, wherein the foam substrate is a current collector.

* * * * *